US010867186B2

(12) United States Patent
Darvish Zadeh Varcheie

(10) Patent No.: US 10,867,186 B2
(45) Date of Patent: Dec. 15, 2020

(54) TRANSACTION MONITORING

(71) Applicant: Genetec Inc., St-Laurent (CA)

(72) Inventor: Parisa Darvish Zadeh Varcheie, Verdun (CA)

(73) Assignee: GENETEC INC., St-Laurent (CA)

( * ) Notice: Subject to any disclaimer, the term of this patent is extended or adjusted under 35 U.S.C. 154(b) by 40 days.

(21) Appl. No.: 15/980,143

(22) Filed: May 15, 2018

(65) Prior Publication Data
US 2019/0354770 A1 Nov. 21, 2019

(51) Int. Cl.
*G06K 9/00* (2006.01)
*G06K 7/00* (2006.01)
*G06K 9/62* (2006.01)
*G06T 7/246* (2017.01)
*G06Q 20/20* (2012.01)

(52) U.S. Cl.
CPC ..... *G06K 9/00771* (2013.01); *G06K 9/00335* (2013.01); *G06K 9/627* (2013.01); *G06K 9/6289* (2013.01); *G06Q 20/208* (2013.01); *G06T 7/246* (2017.01); *G06T 2207/10028* (2013.01); *G06T 2207/30196* (2013.01); *G06T 2207/30232* (2013.01)

(58) Field of Classification Search
USPC ........ 382/100, 103, 106–107, 154–155, 162, 382/168, 173, 181, 189, 192, 199, 209, 382/219, 224, 232, 254, 276, 286–291, 382/305, 321; 235/383, 440; 1/1
See application file for complete search history.

(56) References Cited

U.S. PATENT DOCUMENTS

| | | |
|---|---|---|
| 4,979,815 A | 12/1990 | Tsikos |
| 5,083,638 A | 1/1992 | Schneider |
| 5,609,223 A | 3/1997 | Lizaka et al. |
| 6,177,999 B1 | 1/2001 | Wurz et al. |
| 7,044,370 B2 | 5/2006 | Bellis, Jr. et al. |
| 7,137,556 B1 | 11/2006 | Bonner et al. |
| 7,248,754 B2 | 7/2007 | Cato |
| 7,422,147 B2 | 9/2008 | Rosenbaum |
| 7,801,332 B2 | 9/2010 | Albertson et al. |

(Continued)

OTHER PUBLICATIONS

Scene Understanding: perception, multisensor fusion, spatio-temporal reasoning and activity recognition. Jul. 2, 2007.

*Primary Examiner* — Seyed H Azarian
(74) *Attorney, Agent, or Firm* — Anglehart et al.

(57) ABSTRACT

A transaction monitoring system is provided for monitoring transactions in a variety of transaction locations such a retail locations or gambling or other locations. The transaction monitoring system uses a multi-modal sensor an comprises a system controller that uses multi-modal sensor data to detect abnormal activity. The transaction monitoring system may capture and/or use image data and depth data. The transaction monitoring system may be used to detect theft or fraud for example by determining when there is an unscanned item, an occluded item, an incorrectly scanned item, unmatched plurality or incorrect capital exchange. To this end, the transaction monitoring system may also receive transaction input such as barcode data, or capital exchange data. Also provided is a transaction monitoring method and a system controller for a transaction monitoring system.

45 Claims, 13 Drawing Sheets

(56) References Cited

U.S. PATENT DOCUMENTS

| | | | |
|---|---|---|---|
| 7,954,719 B2 | 6/2011 | Zhu et al. | |
| 8,068,674 B2 | 11/2011 | Goncalves | |
| 8,381,976 B2 * | 2/2013 | Mohideen | G06T 7/62 235/383 |
| 8,448,859 B2 | 5/2013 | Goncalves et al. | |
| 8,474,715 B2 | 7/2013 | Goncalves | |
| 9,070,020 B2 * | 6/2015 | Bobbitt | G06K 9/00718 |
| 2009/0272801 A1 | 11/2009 | Connell, II et al. | |
| 2010/0059589 A1 * | 3/2010 | Goncalves | G06K 5/00 235/383 |
| 2011/0291988 A1 | 12/2011 | Bamji et al. | |
| 2015/0356745 A1 * | 12/2015 | Bobbitt | G06T 7/97 382/103 |
| 2017/0161987 A1 * | 6/2017 | Bulzacki | G06K 9/0053 |

\* cited by examiner

TRANSACTION MONITORING

TECHNICAL FIELD

This patent application relates to the field of security and more particularly to the field of monitoring including monitoring of transactions.

BACKGROUND

Monitoring transactions poses a unique challenge to institutions because of human interaction involved in many transactions. The unpredictable range of human motion, as well as human's creative abilities to disguise fraudulent actions make it very difficult to detect fraud or other abnormal activity automatically. As a result, theft and fraud prevention at the point of transaction often relies on human monitoring. Human monitoring, however, has several drawbacks. It is expensive and human guards cannot be everywhere at once, therefore the area they can monitor is limited. Moreover human monitors offer only imperfect protection since it is always possible that human guards can be bribed or otherwise participate themselves in acts of fraud or theft.

In order to expand the range that a human guard can monitor, camera systems may be used to capture several viewpoints which can each be presented to a remote guard simultaneously on appropriate television-type screens. Post analysis of transaction such as data mining to find irregularities may also be used in an attempt to detect fraud. However, none of these traditional alternatives solutions were found efficient or effective, due to their limited effect, lack of scalability, and to the huge number of transactions.

SUMMARY

Applicant has made a number of discoveries that taken alone or in combination can provide advantages over the state-of-the-art approaches.

In accordance with a first non-limiting embodiment is provided a transaction monitoring system for detecting abnormal activity in the course of a transaction. The transaction monitoring system comprises a multi-modal sensor input interface configured for receiving sensor data from a multi-modal sensor and deriving therefrom at least image data representative of visual information captured according to a first mode of the multi-modal sensor and depth data representative of depth information. The transaction monitoring system further comprises a data fusing module configured for applying a fusion-based analysis to the sensor data to derive from at least the image data and the depth data a pattern representative of human activity not discernible from the image data alone. The transaction monitoring system further comprises an analysis module configured for analyzing the pattern to determine whether it corresponds to abnormal activity. The transaction monitoring system still further comprises an output interface configured for outputting, in response to a determination of the pattern corresponding to an abnormal activity, an indication of the abnormal activity.

In accordance with another non-limiting embodiment is provided a transaction monitoring system for detecting abnormal activity in the course of a transaction. The transaction monitoring system comprises a multi-modal sensor a multi-modal sensor disposed overhead a transaction area configured for performing sensing from a top-down perspective and for outputting sensor data. The transaction monitoring system further comprises a transaction monitoring system controller in communication with the multi-modal sensor for receiving and processing the sensor data and ascertaining the occurrence of the abnormal activity. The system controller is configured for receiving the sensor data and deriving therefrom at least image data representative of visual information and depth data representative of depth information and applying a fusion-based analysis to the image data and the depth data to derive from both the image data and the depth data a pattern representative of a human activity not discernible from the image data alone. The system controller is further configured for analyzing the pattern derived to determine whether it corresponds to an abnormal activity. The system controller is further configured for in response to determining that the pattern corresponds to an abnormal activity, generate an indication of the abnormal activity.

In accordance with yet another non-limiting embodiment is provided a method for monitoring a transaction for detecting abnormal activity in the course of the transaction. The method comprises receiving sensor data from a multi-modal sensor. The method further comprises deriving from the sensor data at least image data representative of visual information captured according to a first mode of the multi-modal sensor and depth data representative of depth information. The method further comprises applying a fusion-based analysis to the sensor data to derive from at least the image data and the depth data a pattern representative of human activity not discernible from the image data alone. The method further comprises analyzing the pattern to determine whether it corresponds to abnormal activity. The method further comprises in response to a determination that the pattern corresponds to an abnormal activity, outputting an indication of the abnormal activity.

BRIEF DESCRIPTION OF THE DRAWINGS

The invention will be better understood by way of the following detailed description of embodiments of the invention with reference to the appended drawings, in which.

DETAILED DESCRIPTION

Figure 1A:
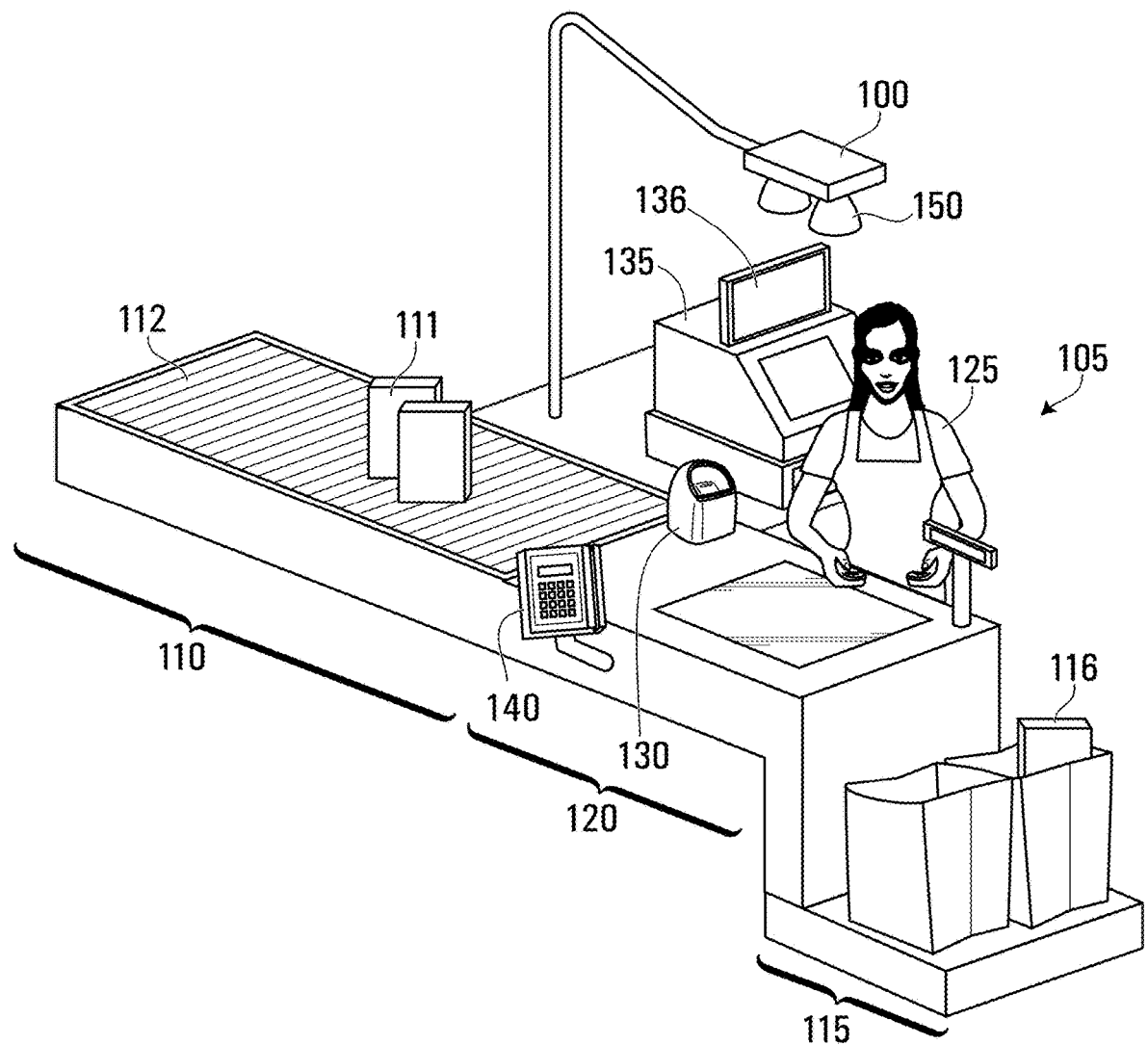
FIG. 1A shows perspective view of a retail transaction location with a transaction monitoring system installation according to a non-limiting embodiment.

FIG. 1A shows an example of a transaction monitoring system 100 installed at transaction location, in this case a point of sale 105. In the particular example show, the point of sale is a retail point of sale which comprises an ingress area 110, an egress area 115, a transaction area 120, a transaction recorder 135 manned by an attendant 125, a barcode scanner 130, and an automatic payment device 140.

Items to be purchased by a customer 111 in the course of a transaction are found in the ingress area 110 where they may have been placed by a customer. In this case, the ingress area comprises an endless belt 120 controlled by the attendant 125, to bring items to be purchased 111 towards the attendant and the transaction area.

Between the ingress and egress areas, is the transaction area 120 where items to be purchase 111 are entered into the transaction. A transaction recorder 135 records the transaction details such as the items that have been purchased and price paid. In the retail setting shown here, the transaction recorder may be a cash register 136 the items 111 may be entered into the transaction manually entering them into a cash register 136 or by other means, such as by scanning them with a barcode scanner 130 that is in communication with the cash register 136. Once the items to be purchased 111 are entered into the transaction at the transaction recorder 135, they are considered to be items included in the transaction 116 and are moved to the egress area 115.

Thus the egress area 115 comprises items that have been included in the transaction 116, in this case by an attendant 125. In the example shown here, the egress area is a bagging station where items are placed into bags. Typically, the items 116 in the bagging area are store goods that have been scanned at the cash register and placed into bags or the like for the customer to carry out upon completion of the transaction.

A typical transaction usually involves the exchange of money or the like (cash cards, gift certificates, store credit, etc.). In the retail example provided here, once all items to be purchased 111 have been entered into the transaction, e.g. by attendant 125, and moved to the egress area 115 for the customer to take after completion of the transaction, the transaction is typically completed by an exchange of capital.

Items duly entered may be placed into the egress area where they are taken by the customer upon completion of the transaction. Typically the transaction is completed by a payment by the customer for the items 116 included in the transaction either by cash (typically entered manually by the attendant 125 into the cash register 135, but increasingly provided into a cash machine that counts the cash automatically, enters its value into the transaction and provides appropriate change) or by an electronic payment device 140 such as an Itnerac™ machine.

The point of sale 105 is monitored by the transaction monitoring system 100. The transaction monitoring system comprises a multi-modal sensor 150 and is located in position that provides a view of the activities surrounding a transaction to the multi-modal sensor. In particular, in this example the multi-modal sensor 150 is positioned above the transaction area 120 and has a view on the transaction area 120 as well as, in this example, a portion of the ingress area 110 and the egress area 120. The transaction monitoring system 100 is shown in more detail in other figures and described in further details in the discussion accompanying these figures.

The transaction monitoring system 100 has a view of an area of monitoring thanks to the multi-modal sensor 150. The area of monitoring comprises the transaction area 120, preferably in whole, and may also include a portion, or all of, the ingress area 110 and/or the egress area 115.

During the normal course of action, ordinary transactions take place at the transaction location. However, the transaction location may be the scene of abnormal activity. Abnormal activity may include any number of irregularities including theft or fraud by which transactions are improperly conducted, recorded or simply falsified. For example, abnormal activity may include unscanned items in a supermarket being processed as scanned, items not corresponding to their scan code, etc. Abnormal activities may also simply be indicators of potential theft or fraud, such as when an item is occluded from view while scanned, it may be properly scanned but this may also be simply accidental.

The transaction monitoring system 100 monitors the point of sale 105 to detect abnormal activity that may indicate an irregularity. For example, human behavior can sometimes indicate a possible theft or mistake. Accordingly, abnormal activity may be deliberate or accidental, and can be by the customer (not shown) or attendant 125. In one class of fraud, sometimes called "sweethearting", an attendant 125 deliberately gives a customer items for free or at a reduced price by not scanning certain items, falsely entering an item as a cheaper one, or falsely entering an inferior quantity of a good, or by other means. But abnormal activity may also be from technical glitches such as when transaction equipment malfunctions.

In one example of abnormal activity, an item 111, or its price, is incorrectly entered as another item into the transaction. As a result, the wrong item may be recorded and charged to/paid by the costumer. This may occur as a result of a human error when items 111 to be purchased or their price if entered manually into the transaction recorder 135. This may also occur when automated item/price entry devices fail. For example, where barcode readers are used, an optical misreading of a barcode is very rare but can occur. More commonly, however, barcodes are deliberately swapped by scammers in order to enter a lower-priced item in the transaction.

Another example of behavioral abnormal activity occurs when an item is moved from the ingress area to the egress area without being entered into the transaction. This irregularity may lead to a customer walking it with an unpaid for item. This kind of irregularity can be accidental, for example if the attendant 125 passes an item 111 in front of the barcode scanner but doesn't notice that it fails to scan, or it may be a deliberate act of theft, either by the customer sneaking items past the attendant, if present, but can also be deliberate sweethearting.

Without specifically listing all possible abnormal activities, it will be appreciated that there are a number of possible such activities that can result in a transaction being improperly executed. Abnormal activity can be challenging to detect, even by a human, when it manifests itself by human behavior. Deliberate theft, for example is hard to discern— especially when the thief is taking steps to avoid detection. Even accidental errors that lead to irregularities can be hard to spot. Using multi-modal sensor data the transaction monitoring system manages to detect even behavioral abnormal activity to maximize transaction integrity.

While in the above example an attendant is present it will be appreciated that the transaction monitoring system 100 may also be used in self-checkout counters where it may operate in much the same was as described herein with respect to the illustrated example. In fact the transaction monitoring system 100 may be particularly beneficial in self-checkout and similar self-serve areas since the absence of a second party may embolden a casual thief to steal or commit fraud.

Figure 1B:
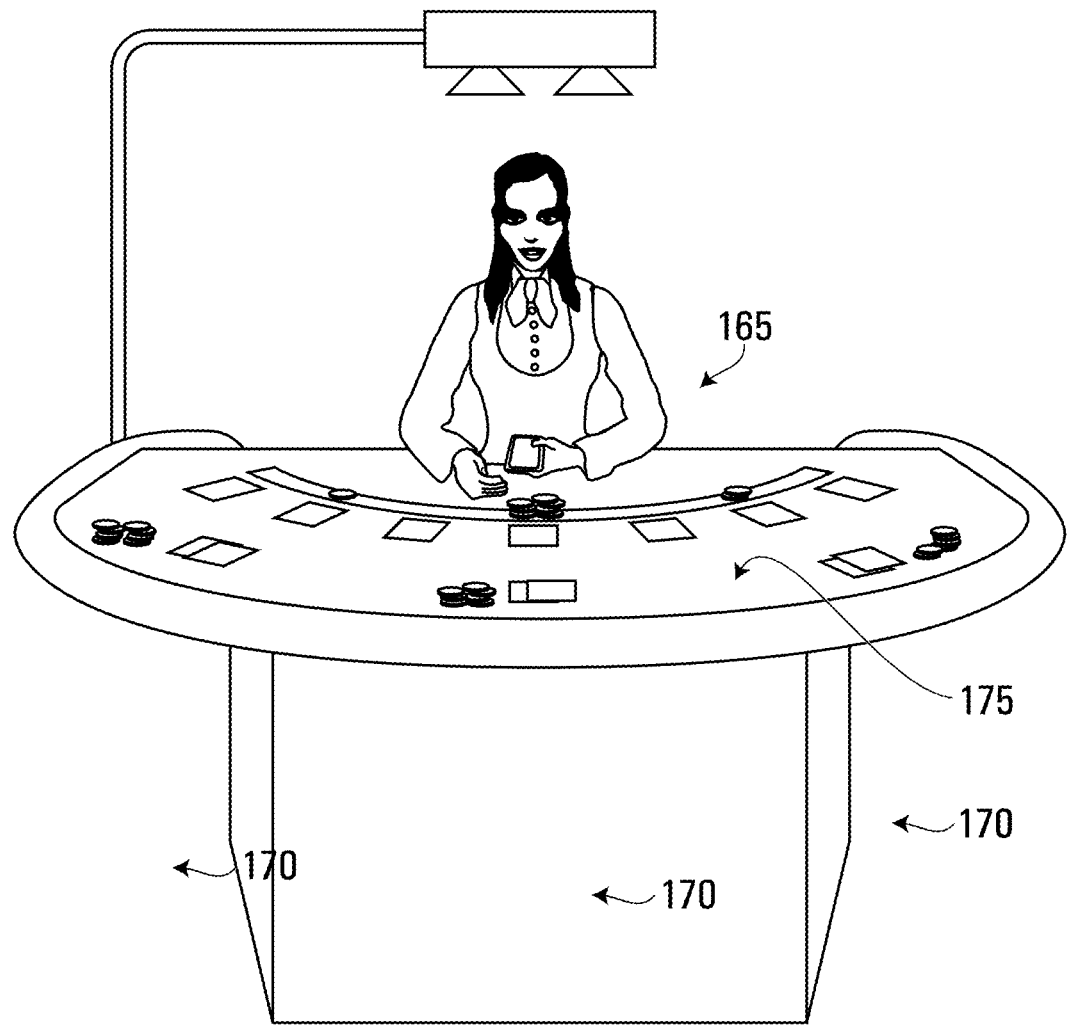
FIG. 1B shows a perspective view of a gambling transaction location with a transaction monitoring system installation according to another non-limiting embodiment.

FIG. 1B shows another transaction location. In this example the transaction location is a gambling location 160 and the transactions involved are gambling transactions. A gambling transaction differs from a retail transaction in that instead of an exchange of goods, or the likes for money, or the likes, flowing typically in one direction, in a gambling transaction, money or the likes (such as cash equivalents like casino chips) may flow in both directions from house (or host) to patron and vice versa depending on the result of an event being gambled on. Thus at every transaction, first the results of an event must be assessed, then the parameters of the transaction (who to receives what) are determined and the transaction is completed, usually by the forfeiting or receiving of chips by a patron. Gambling transactions are also more complicated than retail transactions in that there may be several parties involved (e.g. a hand of poker in which several patrons have played) or there may be several separate but simultaneous transactions (e.g. a hand of black jack in which several patrons have played at the same table).

The gambling location 160 comprises a house area 165, one or more patron areas 170 and one or more transaction area 175.

At the house area 165 is located an attendant 166 that represents the "house" (or host). In this case the attendant 166 is a dealer. It will be appreciated that the attendant 166 is option as there are other gambling settings where the gambling is automated and therefore an attendant 166 is not necessary.

The one or more patron areas 170 is an area for the patrons that are participating in a gambling event. This typically may include the place where they sitting and/or where they keep their chips or other gambling assets.

The transaction area 175 is where the gambling transaction usually takes place, in the example shown here it is on the surface of a blackjack table, but for other games it can take other forms such as a roulette table's betting area. Cash or equivalents, such as casino chips, that are being gambled are typically placed in the transaction area 175. It is also common for gambling assets such as cards in poker or dice in craps to be located in the transaction area 175. When there are multiple transactions happening at the same time, the transaction area 175 may be an area where multiple transactions are occurring or each transaction may have its own transaction area. When there are many transaction areas 100, the transaction monitoring system 100 may monitor multiple transaction areas (anternatively multiple transaction monitoring systems may be used).

The transaction monitoring system 100, shown here in a slightly different form, is installed in such a manner as to monitor the transactions occurring in the transaction area 175. The transaction monitoring system 100 still comprises a multi-modal sensor 150, and is located overhead in the gambling location 160 such that the multi-modal sensor can observe the transaction area 175, the house area 165 and the one or more patron areas 170.

Like in the retail setting, abnormal activity may indicate irregularities such as stealing (chips, for example) or cheating. Abnormal activity may stem from human activity on the house side (e.g. a dealer that makes a mistake or is deliberately active in defrauding the house), from human activity on the patron side (e.g. a patron attempting to cheat) or from technical glitches (e.g. equipment malfunction).

In one example of abnormal activity in a gambling setting, a patron having played a game, such as a round of French roulette or a hand of black jack, and lost may attempt to take a chip back from the table before it is grabbed by the house. Likewise, although access to gambling equipment like cards or dice is typically limited to prevent cheating, a certain amount of patron and dealer interaction with the gambling equipment is required which opens the possibility of swaps/substitutions or other corruptions. Steps are taken to prevent this kind of behavior in casinos but much of this security involves human monitoring which is subject to error and corruption.

In other examples of abnormal activity, a dealer may make a mistake in assessing whether a patron has won at gambling and/or how much the patron has won. This can lead to the irregularity of a patron being paid out where he didn't deserve to be or in amounts exceeding his actual winnings.

Fraud by dealers who are collaborating with patrons, which is very hard even for humans to detect, can be detected by the transaction monitoring system 100. As will be clear in the following description, the transaction monitoring system 100 can detect swapping or tampering of gambling equipment. The transaction monitoring system 100 can also detect when chips have been moved or transferred even when the act of moving/transferring them has been obstructed from view of the multi-modal sensor or other overhead cameras. As a result an unprecedented level of transaction security is achieved with the transaction monitoring system.

Although the two examples provided above illustrate the transaction monitoring system 100 in a fixed location, it will be appreciated that the transaction monitoring system can be made mobile. Mobility can be increased by reducing the number of non-necessary components such as visual alarm 246 and loudspeaker 250 or by integrating different components such as the multi-modal sensor 150 and system controller 210 into a single housing. Mobility can also be increased by using wireless connections such as Bluetooth™ connections instead of wired connections. Thus the transaction monitoring system 100 may be installed temporarily or in a mobile fashion to a temporary or moving transaction location.

Figure 2:
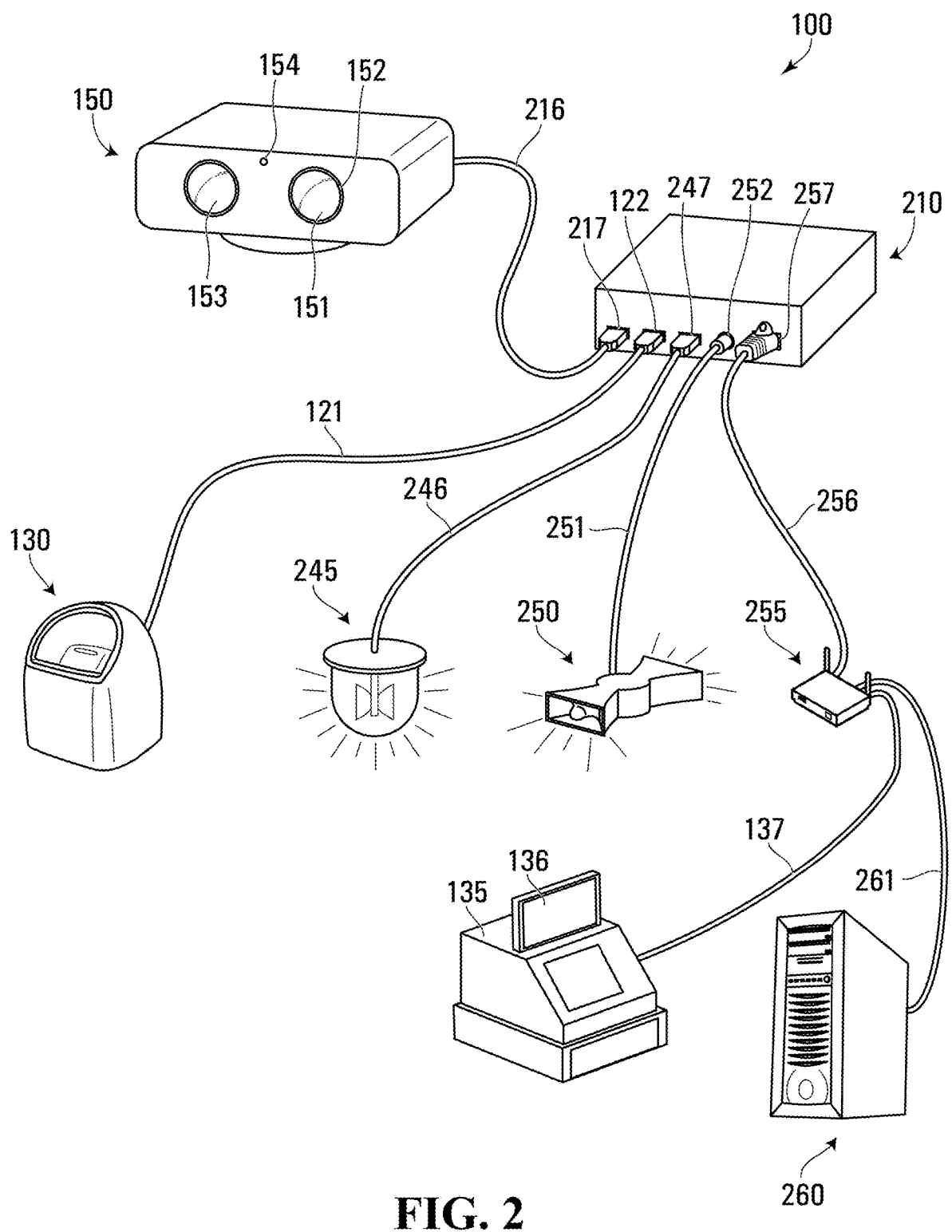
FIG. 2 shows the interconnection between various elements of the transaction monitoring system and equipment at the transaction location according to a non-limiting embodiment.

The transaction monitor system 100 monitors the activity in a transaction location in order to detect abnormal activity. A transaction monitoring system 100 is shown in more detail in FIG. 2. In this example, the transaction monitoring system 100 is a retail transaction monitoring system. As shown, the exemplary transaction monitoring system 100 comprises a system controller 210 and a multi-modal sensor 150. The system controller 210 is also connected to a barcode scanner 120 by a USB cable plugged into a USB port, an alarm system 249 comprising a visual alarm 245 connected by a USB cable 246 at USB port 247 and a loudspeaker 250 connected by an audio cable 251 at a 3.5 mm port. The system controller is also connected to the transaction recorder 135, which in this example is the cash register 136 and a server 260 both of which are accessed through a network via a connection 256 to a router 255 at an Ethernet port 257.

The multi-modal sensor 150 is a sensor that can sense different types of information according to different modes. In a first mode that is a visual mode, the multi-modal sensor 150 is capable of detecting visual information and to generate therefrom image data. To this end, the multi-modal sensor 150 comprises a visual sensor 151, in this case a digital camera 152 comprising a lens and a CCD. While sensing according to the first mode, the multi-modal sensor 150 captures visual information much like such as visible-spectrum light intensity or color and generates image data. The multi-modal sensor 150 captures data repeatedly over time and in this case the image data is captured over and over such as to obtain a sequence of images as is typically done to capture moving images. The image data is output by the multi-modal sensor 150 as part of the overall sensor data generated by the multi-modal sensor 150. The image data can be in any suitable format such as raw uncompressed video formats, but in this example the image data is an MPEG-compressed image stream.

In this example, the digital camera 152 is a typical digital camera that capture visible light and generates image data based on the visible light. However, in alternate embodiment the visual information may be of a different spectrum, such as a subset of the visible light or a spectrum ranging out of the visible spectrum. For example, it may be desired for some settings to use an infrared camera along with an infrared light so as be able to capture dark areas a potential thief or fraudster may think the camera cannot see.

The multi-modal sensor 150 also senses depth information in a second mode and generates depth data therefrom. In the example shown here the multi-modal sensor 150 comprises a depth sensor 153 which may be a range camera such as a time-of-flight based camera or the proprietary "light coding" based camera made by PrimeSense™ used in the Microsoft Kinect™. In this respect, the depth sensor 153 does not need to necessarily use visible light, but may operate using other tools such as infrared light. The depth sensor 153 generates depth data which can be in a variety of forms but in this example is in the form of a depth image, which is a map of pixels where each pixel is a monochromatic representation of the depth of an object at that location. The depth sensor 153 captures depth repeatedly over time such as to obtain a sequence of depth images, which can then be compressed, for example using mpeg standards, or be maintained as raw data. The depth data is output by the multi-modal sensor 150 as part of the sensor data.

While the depth sensor 153 here uses a single depth camera to capture depth, it will be appreciated that other types of depth sensors may be used. For example, the depth sensor 153 may be a stereoscopic pair of cameras combined with a depth or disparity mapping module which captures a stereoscopic pair of images each corresponding to visual information according to a different viewpoint and derives therefrom a depth or disparity map. A depth map is typically an array of depth value for discrete locations in space. It may provide the depth at the location of one of the two captured views, in which case the depth map may be a depth value for each of the pixels in the image corresponding to the view. In that example depth map may optionally also be derived for the other view. Depth maps may be derived from virtual views, for example the depth map may provide a depth image as seen from a location between the two views. Any suitable depth mapping algorithm may be used by a depth mapping module, as can be identified by the skilled person.

A disparity map is a mapping of the disparity of pixels, which indicates the distance between a pixel in one image and its counterpart in the other image (its counterpart being the pixel in the other image that illustrates the same thing). A disparity mapping module may compute the disparity map from the stereoscopic pair of images using any known disparity mapping algorithm. The depth or disparity mapping module may implement any suitable algorithm either as software running on a processor or as a dedicated hardware such as on an FPGA programmed to implement the algorithm. In one example, the multi-modal sensor 150 having a stereoscopic pair of cameras comprises the necessary logic to generate depth information from stereoscopic images and to generate and output depth data. In an alternate example, the multi-modal sensor 150 outputs stereoscopic image data which is output to the system controller 210 which may itself comprise the logic for generating depth information from the stereoscopic images. Either way, the system controller 210 will derive depth data from the sensor data provided by the multi-modal sensor 150.

Generally it is possible to derive depth data from disparity data (particularly where information on stereoscopic camera configuration is available) and vice versa. Thus for the purposes of the present description disparity is considered a form of depth and disparity data is considered a form of depth data.

It will be understood that some sensor hardware for different modes may be common. For example, in the alternate embodiment wherein the depth sensor 153 comprises a stereoscopic pair of cameras, one or both of the stereoscopic cameras of the depth sensor 153 may also serve as digital camera 152 and may generate image data, which may be one or both views, output as part of the sensor data. In that embodiment, particularly if the image data corresponds to the visual information captured by one camera and the depth data is a same-resolution depth map from the perspective of the same camera, fusing the sensor data will simplified.

Typically, however, and in the present example, although the visual sensor 151 and the depth sensor 153 both capture types of images, these do not necessarily have the same resolution, size and frequency of capture. This is reconciled when sensor fusing is performed by the transaction monitoring system 100 as will be described later.

The multi-modal sensor 150 may optionally sense other types of information according to other modes. In the present example, the multi-modal sensor 150 is capable of sensing audio information through sound sensor 154 in a third sensor mode. In accordance with the third sensor mode, the multi-modal sensor 150 records sound picked up by the sound sensor 154. To this end, the sound sensor 154 comprises a microphone which captures sound and transforms it into an analog electric signal. Although analog signals can be used, e.g. subject to digitization at the controller 210, in this example the multi-modal sensor 150 digitizes the analog sound and provides digital sound data as part of the sensor data. In this example, the microphone picks up audible sound in a range similar to that of the human ear although it will be appreciated that lower or higher frequencies could also be picked up by the microphone in alternate embodiments. The sound sensor 154 generates audio data which is output by the multi-modal sensor 150 as part of the sensor data 150. The audio data may be digital audio data in any suitable format. In this embodiment, the sound sensor 154 records continuously and generates continuous audio data which is output continuously by the multi-modal sensor 150.

In an alternate embodiment, the multi-modal sensor 150 detects the presence of sound above a certain threshold and outputs.

As described, the multi-modal sensor 150 operates in different modes to sense different information. While the different modes are described separately here, it should be understood that they may occur concurrently. For example, while the visual sensor 151 captures visual information in a first mode and the depth sensor 153 captures depth information, they may do so simultaneously, although not necessarily so. Likewise, the sound sensor 154 captures sound information continuously according to the third mode and does so while visual and depth information are captured. In alternative embodiments, each mode may occur non-simultaneously, for example in sequence to generate, e.g. visual, depth and audio data corresponding to sequential occurrences of each.

It should be understood from the foregoing that sensing under a particular mode can occur over a period of time; in the example of the first and second modes described hereabove, the sensing occurs over time through discrete repeated occurrences. Sensing may also occur continuously over time, as in the case of the third mode in this example.

In this example, sensing by the multi-modal sensor 150 is performed on an ongoing basis with sensor data being generated regularly or constantly. It is up to the connected equipment receiving the output of the multi-modal sensor 150 to elect when and how to use this data. But in an alternate example, the multi-modal sensor 150 is controllable over an input interface whereat it receives requests for sensor data. The request may be a global "provide sensor data" request in response to which the multi-modal sensor 150 captures sensor data according to its different modes and provides it at its output (or, alternatively, releases sensor data it has acquired but not output). Or the request for sensor data may be a request for a specific type of data according to a particular mode of the multi-modal sensor 150, in response to which the multi-modal sensor 150 captures the requested data and provides it at its output (or, alternatively, releases the requested data from data it has acquired but not output).

In addition to the visual sensor 152, the depth sensor 153 and the sound sensor 154, the multi-modal sensor 150 may include other sensors and generate other sensor data according to additional modes.

The sensor data may be provided in any suitable format, which may be encoded or not. If encoded data is provided, then the system controller 210 may comprise the suitable decoding logic for decoding it. For example, both depth map and visible light images may be encoded using an MPEG standard and the system controller 210 may comprise an MPEG decoder, e.g. at Multi-Modal Sensor Interface 315.

One of the challenges of transaction monitoring is that monitoring equipment should generally be out of the way so that it does not impede the ability to perform a transaction and yet should have a good view of the transaction area. Oftentimes the best and easiest place to affix monitoring equipment, such as the multi-modal sensor 210, is directly overhead, e.g. affixed to the ceiling. For many configurations, it is only from this position that we can have a good view coverage spanning the whole transaction area and surround areas, to make sure that, e.g., nothing bypasses the area of monitoring. This may not be possible from other available mounting positions such as from atop the cash register. However, an overhead mounting position for a top-down view field means that from a visual standpoint, image data recorded from this position cannot discern items that are hidden below other items. For example if the attendant 125 of FIG. 1A scans, e.g., a box of cereal while holding underneath is a memory card package, this pattern of human activity may not be discernible from the image data alone. Advantageously, the system of the present example fuses image data with depth data, which allows it to determine patterns of human activity that would not be discernible from the image data alone.

In particular, by incorporating depth into the detection of patterns of human activity, it becomes possible to determine three dimensional object paths and other three dimensional information in the pattern which may be indicative of abnormal behavior. For example, if an object is being scanned by the barcode scanner 130 and an object is in front of the barcode scanner, it may not be possible to discern from the image data alone, that the object seen in front of the scanner is, in fact, too high to be scanned. This could mean that the object being actually being scanned is in fact covered by other objects on top of it which together appear as a single object to an overhead image camera by thanks to depth sensor the transaction monitoring system 100 can determine a pattern of human behavior that shows the object seen in image data is in fact too high for the barcode scanner 130. In another example where barcode scanning information is not available to the transaction monitoring system 100, the mere fact that an object is too high to be scanned may indicate that an object has been passed above the barcode scanner without scanning. The fusing of depth and image data may allow any number of other patterns to be determined that would otherwise not be discernible from image data alone. For example when determining tracking objects to track, depth data may be used to obtain a three dimensional geometry for the tracking object which can be used to detect abnormal activity. In one example, the three dimensional geometry is used by an object recognition module (discussed in more details below) to recognize an object, e.g. being scanned, which can then be compared to barcode data to determine if the scanned object corresponds to the one observed by the transaction monitoring system.

As will be appreciated, the height of an object may not be discernible difference to image data captured from an overhead position; the image data for the same object at slightly different heights may be substantially similar. By extension the height component of a three-dimensional path of an object may not be discernible from image data alone; the image data may only be useable to discern a two dimensional path, if that. Likewise it may not be possible, from image data alone, to ascertain the difference between two three dimensional objects having different dimensions but similar appearance in a particular orientation.

That being said, depth data is not just useful in that it provides depth information but, as will be further described herein, data fusing allows an accurate determination of a pattern of human behavior in a way that merely using image data does not permit. For example, depth data does not merely provide depth information for target objects identified in the image data, but changes in depth can be used to identify target objects where image data does not vary as much, and vice versa. Overall, data fusing allows an accurate definition of target objects, tracking of the target object in three dimensions, and determination of a pattern from the sensor data.

Although only one multi-modal sensor 105 is shown here, it will be appreciated that more could be present and do not necessarily need to each have their own system controller 210. For greater coverage of a transaction area, a system controller 210 may use the data from more than on multi-modal sensor 105 (or from a multi-modal sensor with additional sensors). The skilled person will appreciate that the additional multi-modal sensor data may be used as described in the following description by applying the techniques taught herein to the additional data. If the system controller 210 has sufficient resources, the system controller 210 may also be connected to different multi-modal sensors 105 for monitoring completely different transaction areas. The skilled person will appreciate from the following description that this can be accomplished by sharing the logic/resources provided herein for the different multi-modal sensors, e.g. using time-division sharing of resources along with appropriate context switching methods to isolate the different processes and/or by providing additional (e.g. duplicates) logic/resources for additional multi-modal sensors.

The system controller 210 is operative to receive the sensor data as well as, optionally, transaction data and to determine therefrom the presence of abnormal activity. The system controller 210 comprises logic hardware for performing the functions described herein. In the present example, the logic controller 210 comprises a general-purpose computer as shown in more detail in FIG. 3 and described below. In this particular example, the system controller 210 comprises three USB ports 217, 122, 247, an audio out jack 252, and an Ethernet connection 257 having a RJ45 connector.

The multi-modal sensor 150 is connected to the system controller 210 via a suitable sensor connection 216, which in this example is a cabled connection and more particularly a USB connection, effected by a USB cable connecting the multi-modal sensor to the system controller 210 at the USB port 217. The sensor connection 216 is used in this example for unidirectional communication of sensor data to the system controller 210 although in alternate embodiments, the sensor connection 216 may also transport requests for sensor data described above or other commands to the multi-modal sensor 150 sensor. Although in the example shown all sensor data and optional commands/requests are transported over a single cable, it will be understood that the sensor connection 216 may be distributed over plural cables and/or wireless interfaces. Although here, the sensor connection 216 is USB connection, other connections are possible including wireless connections, e.g. using Bluetooth or a WiFi connection. In the latter case, the multi-modal sensor may be a networked device transmitting the sensor data over a, e.g., local area network using known techniques. This is also possible with a wired connection from the multi-modal sensor to the network. In the case where the multi-modal sensor 150 is a networked device, the sensor connection 216 may pass through a router, such as router 255 shown here.

The system controller 210 of this example is configured to receive transaction input, which is input indicative of transaction event being undergone and/or recorded. The transaction input may come from the multi-modal sensor 150, such as when the sound sensor 154 detects the sound of an item being scanned, or from other devices. In the present example, the system controller is connected to the scanning system, in particular the barcode scanner 130 via the scanner connection 121 which here is a USB connection using USB port 122. The system controller may alternatively, or additionally, be connected to the transaction recorder 135, which may itself have knowledge of the items being scanned and provided via the transaction recorder connection 137. In this example, the controller system 210 is connected to the cash register 136 and receives therefrom capital exchange data, which describes money or equivalents being exchanged in the course of transactions. The transaction recorder connection 137, like the scanner connection 121, can be any suitable data exchange connection; in this example the transaction recorder 135 is a networked device connected to the network via router 255 and the transaction recorder connection 137 is a network connection.

The system controller 210 of this example also has alert outputs for outputting visual and audio alerts indicative of abnormal activity. To this effect, the system controller 210 is connected to a visual alarm 245, which in this example is a revolving warning light and a loudspeaker 250. The control system is designed to communicate with the connected devices according to their specifications. Here the warning light 245 is a simple USB device connected by a USB connection 246 via USB port 247 and the loudspeaker is a standard amplified loudspeaker connected over an analogue audio cable via a 3.5 mm jack driven by a digital-to-analogue converter in the system controller 210.

The system controller 210 is itself a networked device, connected to a network via a network connection 256. In this example the network connection is an Ethernet connection to router 255 using Ethernet port 257. The system controller 210 is in network communication with a server 260 via a network connection 261 which passes through the router 255 and connection 256.

The system controller 210 will now be described in more details with reference to FIG. 3. The system controller 210 is shown here in a block diagram illustrating logical organization of the system controller. As described, the system controller 210 of this example is embodied by a general-purpose computer configured to perform the described function. More specifically, the system controller 210 comprises a processing entity made up of one or more processing units (typically a single multi-core unit), together referred to as the CPU, running an operating system and drivers for the various hardware in and connected to the system controller 210. The system controller of this example comprises a USB interface, an audio interface, and a network interface as well as, optionally GUI interfaces such as an output video interface, e.g. an HDMI interface and keyboard and mouse port interface, although such devices are more typically connected via a USB interface. The system controller 210 comprises a memory storing software comprising instruction configured to cause the CPU to receive from input devices the data required, to perform the processing tasks of the system controller 210, and to output to output devices the required output. A skilled programmer having regard to the present description is capable of writing the software code corresponding to the disclosed system, as such the software code for the system controller 210 will not be provided here.

Figure 3:
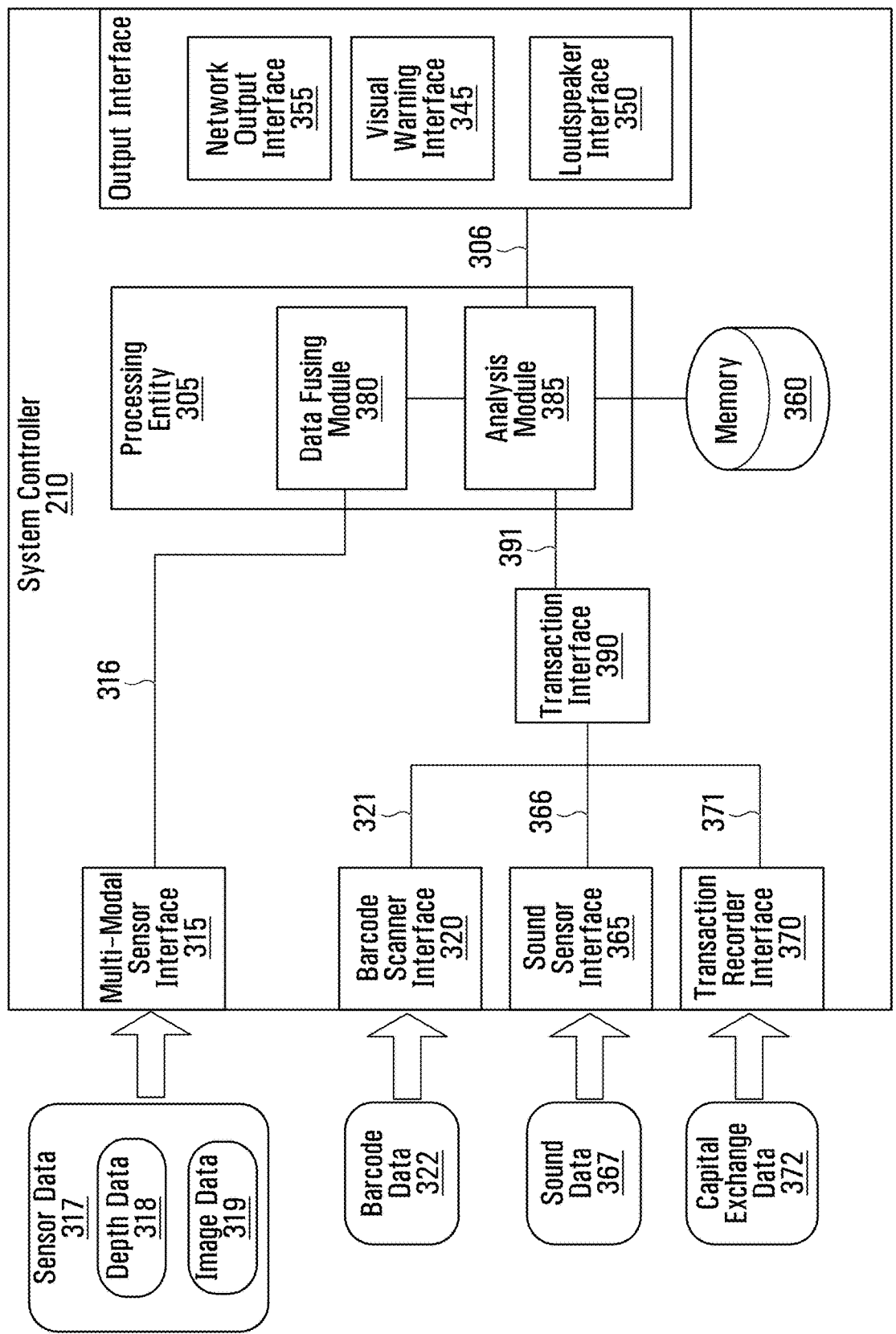
FIG. 3 is a block diagram illustrating the system controller of the transaction monitoring system of FIG. 2.

Returning to the logical block diagram of FIG. 3, the system controller 210 comprises a multi-modal sensor interface 315 which is configured for receiving sensor data from the multi-modal sensor 150 and to derive data therefrom such as image data image data representative of visual information captured according to a first mode of the multi-modal sensor and depth data representative of depth information captured according to a second mode of the multi-modal sensor. In this particular example, the sensor data comprises the image data and the depth data such that the system controller 210 can derive it directly, e.g. by simply extracting it or parsing it out, without having to compute it from other data contained within the sensor data (as when depth data is computed from stereoscopic image data). More specifically, the multi-modal sensor interface 315 is configured for receiving sensor data from the multi-modal sensor, a transaction interface 390 for receiving transaction input, which in this example comprises a barcode scanner interface 320, a microphone interface 365 and a cash register interface 370. The system controller 210 also comprises an output interface which comprises a network output interface 355, a visual warning interface 345 and a loudspeaker interface 350. Connected therebetween is processing logic, here referred to as processing entity 305, which comprises a data fusing module 380 and an analysis module 385. There is also memory 360 which is accessible to the processing entity 305 for storing data used by the processing entity 305 in the running of its algorithms. It is to be understood that this partitioning of the system controller 210 represent logical modules, not necessarily physical ones.

More specifically, the multi-modal sensor interface 315 is responsible for receiving sensor data 317 from the multi-modal sensor 150 and to derive therefrom usable sensor data 316 such as depth data 318 and image data 319 in a form that may be used by the processing entity 305 in performing its function. As described above, the sensor data arrives in practice over a USB connection whereupon it is dealt with by the multi-modal sensor interface 315, which in this example, parses the data and, optionally applies decoding, e.g. MPEG decoding, if this is not done elsewhere.

The barcode scanner interface 320 is responsible for receiving barcode data 322 from the barcode scanner 130 and to derive therefrom usable item data 321. The usable item data may simply be the barcode or corresponding identifier in a form that can be used downstream by, e.g., the transaction interface 390 or analysis module 385, for identifying an object that has been scanned but in this example the barcode scanner interface 320 identifies itself the object being scanned on the basis of the barcode and derives a unique identifier with which to find the object in an object database. In alternate embodiment, this unique identifier may simply be the numeric UPC code, which is provided by the barcode scanner 130 but is parsed from the barcode data 322 and provided in suitable digital format by the barcode scanner interface 320, but in this embodiment the barcode scanner interface looks up the numeric UPC code in a table or database (not shown) and finds an associate unique object code which it provides as usable barcode data 321.

The transaction recorder interface 370 receives data from the transaction recorder. This may include any number of types of data, including, as mentioned above, the barcode data 322. But in this embodiment, the transaction recorder interface 370 receives capital exchange data 372 from the cash register 136, which provides details as to the exchange of capital, e.g. money, recorded for the transaction. The transaction recorder interface receives the capital exchange data 372 in the form provided by the cash register and derives therefrom usable capital exchange data 371, which comprises information on the capital exchanged (e.g. how much money was recorded as provided, and by what medium: cash, Interac™, gift card, etc. . . . ) in a form usable by the processing entity 305.

The sound sensor interface 365 is shown here as separate from the multi-modal sensor interface 315 to illustrate the fact that the sound sensor interface can be a separate interface, e.g. if a microphone is used that is plugged into the system controller 210 via, e.g., an analog audio-in jack. However, in the example of FIG. 2, the sound sensor is part of the multi-modal sensor 153, and sound data 367 will be received and treated by the multi-modal sensor interface 315, which will derive therefrom usable sound sensor data 366 to the processing entity 305. As such, the multi-modal sensor 150 interface may receive transaction input as part of the sensor data 317.

The transaction interface 390 is an optional module that combines the transaction inputs received to derive therefrom information on a transaction being performed and/or recorded. In this example, the transaction interface takes the usable barcode data 321, the usable sound data 366 and the usable capital exchange data 372 and creates a transaction profile data 391 which details the nature of the transaction as recorded in the transaction input. In this example the transaction interface 390 accumulates the data for an entire transaction and provides the transaction profile data 391 for an entire transaction which comprises details of what was objects were involved in the transaction and what capital was exchanged for the processing entity 305. In alternate embodiments, however, the transaction interface 390 may be absent, and the processing entity receives the various useable transaction input data directly from the respective interfaces.

Although the transaction interface 390 is shown here as separate from the barcode scanner interface 320, sound sensor interface 365 and transaction recorder interface 370, all the logic for retrieving transaction input may be said together to make up a transaction input interface configured for receiving a transaction input.

The processing entity 305 comprises the processing logic for performing data fusing and analysis of a transaction within the data fusing module 380 and analysis module 385. As set forth, these may be embodied by computer-readable software code stored in a memory and comprising instructions for the CPU to exectute the functions of the processing entity. The processing entity 305 is shown in more detail in FIG. 4A and FIG. 4B, which shows in a block diagram the logical components of the processing entity 305.

Figure 5:
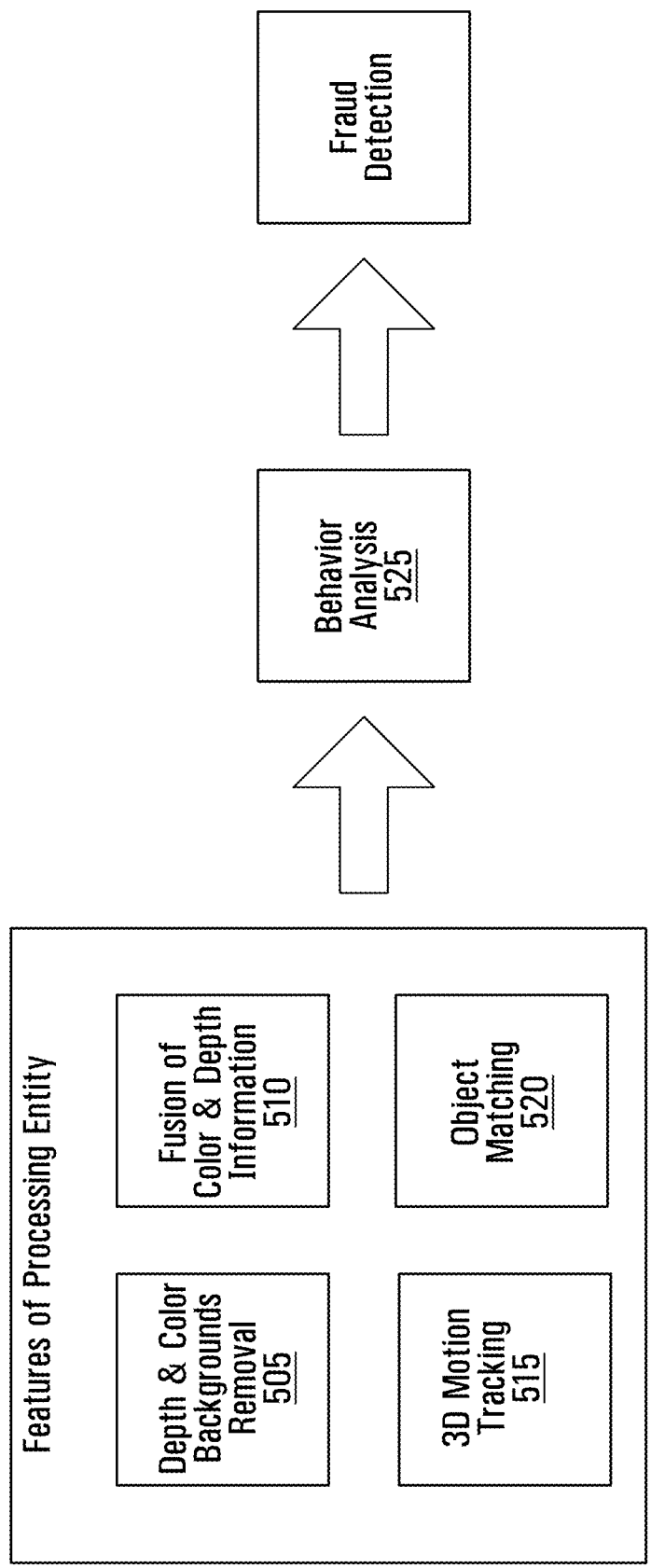
FIG. 5 is a flow chart illustrating some features of the transaction monitoring system of FIG. 2.

FIG. 5 illustrates some of the features of the processing entity 305. As illustrated the processing entity 305 performs depth and color background removal 505, fusion of color and depth information 510, 3D motion tracking 515 and object matching 520. All this is performed in the data fusing module 380, as will be described in more details below. Once this is done, the processing entity 305 performs behavior analysis 525 at the analysis module 385, which allows fraud detection with the transaction monitoring system 100.

Figure 4A:
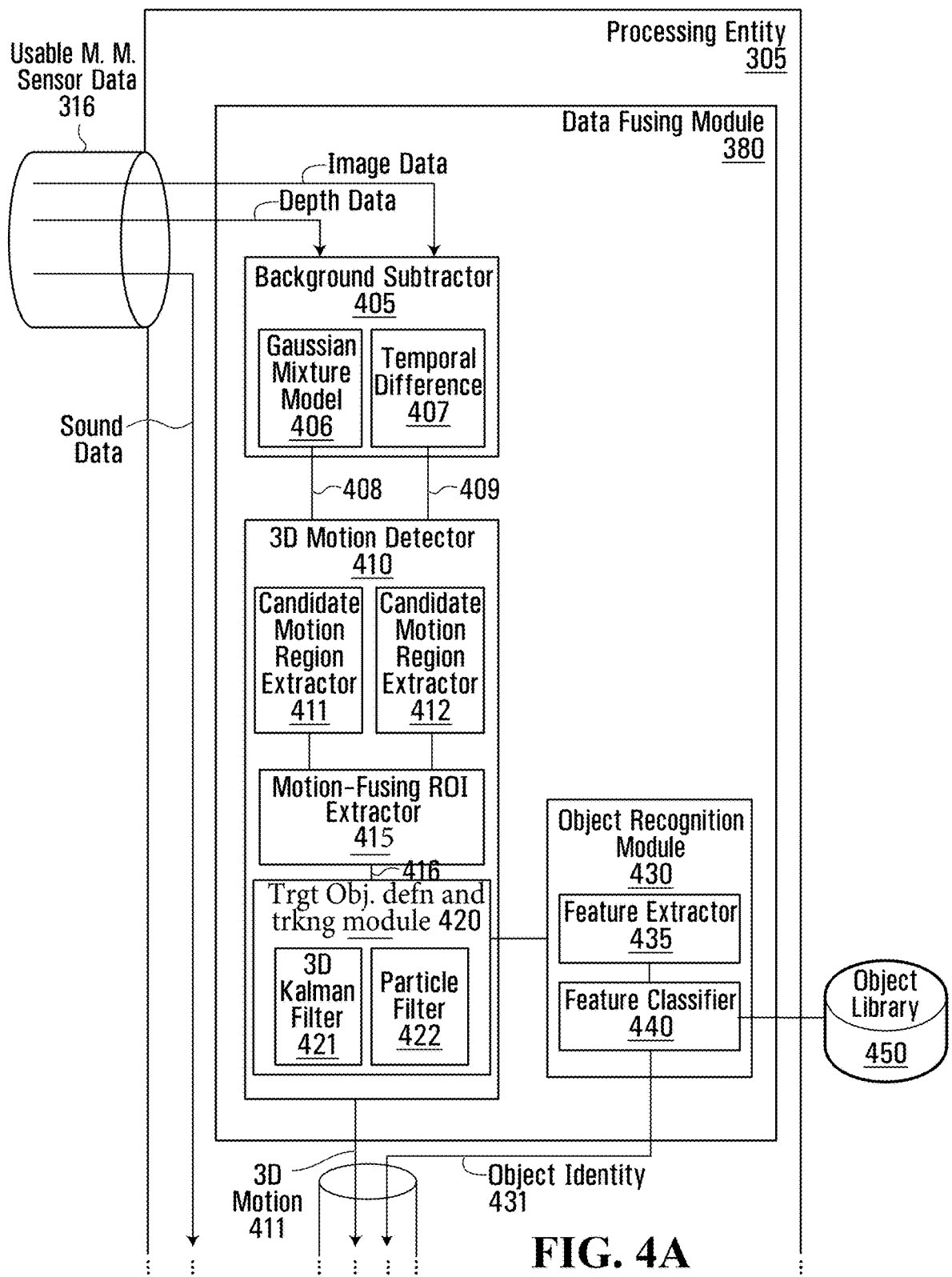
FIG. 4A is a block diagram showing a portion of the processing entity of the system controller of FIG. 3.

Turning now to FIG. 4A, the data fusing module 380 is configured for applying a fusion-based analysis to the sensor data to derive in this example from at least the image data and the depth data a pattern representative of human activity. In particular the data fusing module 380 comprises a background subtractor 405, which in this example employs a Gaussian mixture model 406 and a temporal difference 407.

The data fusing module 380 further comprises a 3D motion detector 410, which in this example comprises a first candidate motion region extractor 411 configured for extracting candidate motion regions from image data, a second candidate motion region extractor 412 configured for extracting candidate motion regions from the depth data, and a motion fusing region of interest (ROI) extractor 415. The 3D motion detector 410 further comprises a target object definition and tracking module 420 which itself employs a 3D Kalman filter 421 and a particle filter 422.

The data fusing module further comprises an object recognition module 430 which comprises a feature extractor 435 and a feature classifier 440.

The background subtractor 405 is configured to apply a first background subtraction algorithm to the image data and a second background subtraction algorithm to the depth data. Specifically the background subtractor 405 takes the usable image data and applies using a Gaussian mixture model 406 to isolate foreground image data from the background and to derive foreground image data representative of objects in the foreground. An example of a Gaussian mixture model is provided by Stauffer, C.; Grimson, W. in Adaptive background mixture models for real-time tracking, in Proceedings of IEEE Computer Society Conference on Computer Vision and Pattern Recognition, (CVPR 2000), Hilton Head, S.C., USA, June 2000; pp. 246-252.

The background subtractor 405 takes the usable depth data and applies running average background and temporal difference algorithm to isolate foreground image data from the background and to derive foreground image data representative of objects in the foreground. An example of a running average background and temporal difference algorithm is provided by Yi, Zh.; Liangzhong, F. in Moving Object, in proceedings of IEEE International Conference on Intelligent Systems and Knowledge Engineering (ISKE), 2010; pp: 270-272.

There are some challenges regarding to work with a multi-modal sensor. Depending on the type depth sensor used, multi-modal sensor may emit IR rays and records the reflected IR patterns from the scene as a depth image. Provided depth images could be noisy and distracted due to, e.g., two types of objects 1) highly reflective objects in the scene such as shiny metals and mirrors 2) highly absorptive (fluffy and/or dark materials). These two categories will scatter the received IR rays and entail to incorrect registration of depth information. Noisy depth image is a very big challenge in 3D motion analysis, 3D object tracking and 3D object recognition modules, since an incomplete form of object is visible in the image. Other challenges regarding to work with such a sensor is the depth error estimation due to the physical limitations of the sensor. The depth error, for the objects of maximum 2 meters away from the camera has been found to be negotiable for this application, using available depth sensing technology. Moreover, the mapping error of color and depth images due to the missing depth information has been typically considered to be an obstacle in this field.

To detect 3D motion on the scene, we identify the places in both color and depth images and then in video streams, where there is a motion. Because of the nature of two types of images (i.e. depth and color), two different background subtraction techniques are applied for each of them. Both algorithms are be fast but each algorithm addresses its own challenges, for example the color background subtraction used can handle the illumination variations while the depth background subtraction used can handle noisy depth images.

Multimodal sensor provides separated depth image and color image, when there is a motion in a scene, ideally the same region should be detected in both of them. But due to the issues mentioned herein, color and depth background subtraction methods would typically extract candidate motion regions that might or not have overlapped each other with prior art methods. Therefore, there is performed a 3D motion analysis on a candidate motion region of interest (ROI) of one image, which is synchronized and matched to the same ROI of the other image. This is solves mutual information problem which has been an obstacle in prior art attempts.

In this particular example is used motion detection by background subtraction. The background subtractor 405 provides foreground image data 408 and foreground depth data 409 to the 3D motion detector 410. At the candidate motion region extractor 411, the 3D motion detector 410 analyses the foreground image data 408 and identifies candidate motion regions based on the extracted foreground data. Likewise at the candidate motion region extractor 412, the 3D motion detector 410 analyses the foreground depth data 409 and identifies candidate motion regions based on the extracted foreground data.

Once candidate motion regions have been identified for both the image data and the depth data, these two must be fused together. In the other word, one should be registered on the other one to have unique mutual information from both sensors and make sure the common parts from each candidate region are overlapped to each other. To do so a modified version of the algorithm proposed by Torabi, A. and Bilodeau, G.-A. in Local self-similarity based registration of human ROIs in pairs of stereo thermal-visible videos, in Pattern Recognition, Vol. 46, No. 2, 2013, pp. 578-589, is applied by the motion fusing ROI extractor 415. The motion fusing ROI extractor 415 thus extracts fused region(s) of interest 416 for object definition and tracking.

Once the candidate regions from both sensors are mapped to each other the fused ROI 416 are provided to the target object definition and tracking module 420. The next step is to track the segmented motion regions in order to analyze human behavior at the transaction location. Prior art object tracking approaches are limited to track 2D object information. The present system and method provides a mathematical 3D representation of object tracking that is able to reliably cope with occlusion of one item by other items or objects in the scene and handling object rotations during the item scanning which has been an insurmountable problem in the past. The target object definition and tracking module 420, performs target feature selection for 3D tracking of a specific item, effectively tackling the challenges of features which must be enough distinctive, representative, fast to compute, and robust enough to color illumination changes, and noisy depth information.

The term object "definition" is sometimes used here to describe the identification (or defining) of a target object from the data so as to contrast with the term object "identification" which is sometimes used herein to describe identifying an object of a transaction, e.g. using barcode data. The term target object will generally refer to an object presumed by data fusing module 380 to contrast with a particular object which may be a real-life object. For example, when a particular object enters an area of monitoring, the data fusing module 380 may define a target object in the processed sensor data where it considers the sensor data to represent the particular object. This will be described in more detail below.

The pattern 381 of human activity may comprise the motion of a target object, such as the displacement of an item by a cashier towards the egress area 115. The data fusing module 380 is configured for applying a fusion-based object tracking algorithm according to which the image data and the depth data are used in combination to identify the motion of the target object in three dimensions. To this end, the target object definition and tracking module 420 may run a continuous process which may comprise the three main steps of target initialization, following of target, exiting of target (drop).

For target initialization, the target object definition and tracking module 420 analyzes the sensor data as processed up until now and particularly data representative of an ROI. The target object definition and tracking module 420 is configured to define the target object on the basis of the sensor data when a particular object enters the region of interest. Target initialization is done when an item enters to an area of monitoring (in this example, when an item enters the area monitored by the transaction monitoring system 100). In this process, features of an item known as a tracking target are extracted. Target initialization introduces the attributes of an item in the target tracking process.

The motion of a particular object being tracked in may comprises a path in three dimensions. In this example, the data fusing module is configured for identifying at least one subsequent position for the target after defining the target, and to derive from the at least one subsequent position the path in three dimensions of the target object. To this end, the target object definition and tracking module 420 pursues target tracking by continuous follow-up of the movement of the object on a frame-by-frame basis since it has been initialized and finds in each frame, the same target that was initialized when the particular object entered the area of monitoring and updates the item features accordingly. To do so, the object definition and tracking module continuously extracts features of items in the ROIs for each frame, as was done in the initialization stage and applies a modified version of a 3D Kalman filter provided by Salih, Yasir and Malik, Aamir Saeed, in 3D object tracking using three Kalman Filters, in Proceedings of IEEE Computer Society Conference on Computers & Informatics (ISCI), 2011, pp. 501-505, in combination with an adaptive particle filter to identify concordance from one frame to the next.

This form of tracking continues until the particular object being tracked leaves the area of monitoring whereupon the target object is no longer discernible from the sensor data at which point the target object definition and tracking module 420 defines a target object exit.

The motion of the particular object may also include a rotation. The target object definition and tracking module 420 is configured for performing feature extraction on the target object on the basis of the movement in three dimensions of the extracted features, and based on the movement in three dimension of the extracted features, detect a rotation.

Thus the target object definition and tracking module 420 determines the 3D motion of a target object. It defines this motion in any suitable digital form which is provides as 3D motion data 411.

In addition to detecting motion of a particular object in three dimensions, the pattern 381 detected by the data fusing module 380 may also include an object identity, the data fusing module being configured for applying a fusion-based object recognition algorithm according to which the image data and the depth data are combined to derive therefrom a target object identity. To this end, the data fusing module 380 comprises object recognition module 430.

The object recognition module 430 applies a 3D object recognition algorithm and comprises a feature extraction submodule 435 and a feature classification submodule 440. Visual item recognition can be performed using a 2D object recognition method whereby a trained algorithm like a neural network algorithm is trained using a large number of images of object to be recognized, taken from multiple-views for each object. In this, example, however, 3D object recognition is employed, whereby the system is provided a 3D map of the object model with fewer images. The 3D object recognition method is capable of recognizing items even if they are partially occluded other objects, which is preferable for detecting fraudulent activities described above. In addition the 3D object recognition method also can be applied on any object sizes and in any postures. In this particular example, a modified and adapted version of 3D pattern recognition that has been addressed by Liefeng Bo, Xiaofeng Ren and Dieter Fox in Depth Kernel Descriptors for Object Recognition (http://mobilerobotics.cs.washington.edu/postscripts/dkdes-iros-11.pdf) was used. The feature classifier is able to learn various objects in the store if any new items has been added to the store items and recognized them accordingly.

In particular, the feature extractor 435 extracts features of a target object, and the feature classifier 440 classifies the extracted features by comparing them to an object library 450, which may be separate from the feature classifier 440, data fusing module 380, and indeed even from the system controller 210. The object library 450 may be stored in the memory 360, but it may alternatively reside elsewhere, e.g. on the network, provided that it can be accessed quickly enough to compare large numbers of features. In one alternate embodiment, the object library 450 is merely provided with extracted feature definitions and performs classification on-site, e.g. at a remote server location, and returns an object identity. In this example, however, the object library 450 is located on a local, rapidly-accessible memory (which may be memory 360), and is consulted by the feature classifier, who based on the features extracted and the object library data identifies the particular object and derives an object identity 431.

The object recognition module 430 thus generates an object identity for the target object. The object identity may comprise any number of details pertaining to the identified object. These details may be included with the object library 450 used by the feature classifier 440, but in this example the object library 450 only contains the necessary information to derive an object identifier (e.g. numerical UPC code or other unique identifier) and additional data on the object are optionally retrieved using the UPC code from another database (not shown).

While 3D motion determination is an ongoing process occurring on a frame-by-frame basis (e.g. performed on every frame available or on a subset thereof), the object recognition should in principle be static of a target/particular object. For this reason, object recognition may not necessarily occur on a frame-by-frame basis, but may occur as little as once during the passage of a particular object through the area of monitoring. In this example, however, object recognition is performed as often as computing time permits for a given object, which means a same target object may undergo recognition more than once. This allows the algorithm a chance to corroborate previous findings for object recognition, and in the case of conflict, apply a decisional algorithm to select the most likely result (e.g. the one obtained most often) for an object.

In certain instances, it is possible that an object cannot be identified based on the features extracted. This may be because the object is simply not previously known and not classifiable using the object library 450. In general, this may be a sign that the object in question is not one of the objects to watch out for (e.g. not an item from a store's inventory; maybe a client's personal possession) but the size and path of the object may also suggest in certain cases that it is being used to occlude another object. Alternatively, an object may be partially concealed to the extent that positive identification is not possible. In such instances object identify 431 may include indications of objects that are not recognized.

Further below, the use of transaction input to identify objects recorded in a purported transaction will be described. It should be appreciated that in an alternate embodiment of the object recognition module 430, the object recognition module 430 may receive or determine an identification of an object as derived from transaction input and use this as a starting point for rapid searching of the classification database. By starting with the assumption that the object being recognized is the object identified from transaction input, which is generally the case if there is no abnormal activity, the object library may be accessed firstly at the location of the classification data for that object which speeds up recognition for the presumed majority of cases where the transaction input corresponds to the tracked object.

While the foregoing description has been provided with examples wherein only one object is being tracked, it will be appreciated that multiple objects can be tracked and identified using this approach. Indeed, based on the ROIs found and features extracted, it may be that there are multiple target objects identifiable in the sensor at any time as identified using the exact techniques provided here. In such a case, the 3D motion data 411 and object identity 431 may be provided for multiple objects. In particular, the feature selection performed by the target object definition and tracking module 420 is particularly well suited for identifying partially occluded objects and differentiating adjacent or overlapping objects.

The data fusion module 380 thus is performs detection of multiple items visually, tracking and recognizing of these items. The data fusion module 380 derives a pattern 381 representative of human activity, which in this example includes 3D motion data 411 for particular objects and object identity 431. This is provided to the analysis module 385 which is configured for analyzing the pattern 381 to determine whether it corresponds to abnormal activity.

Figure 6:
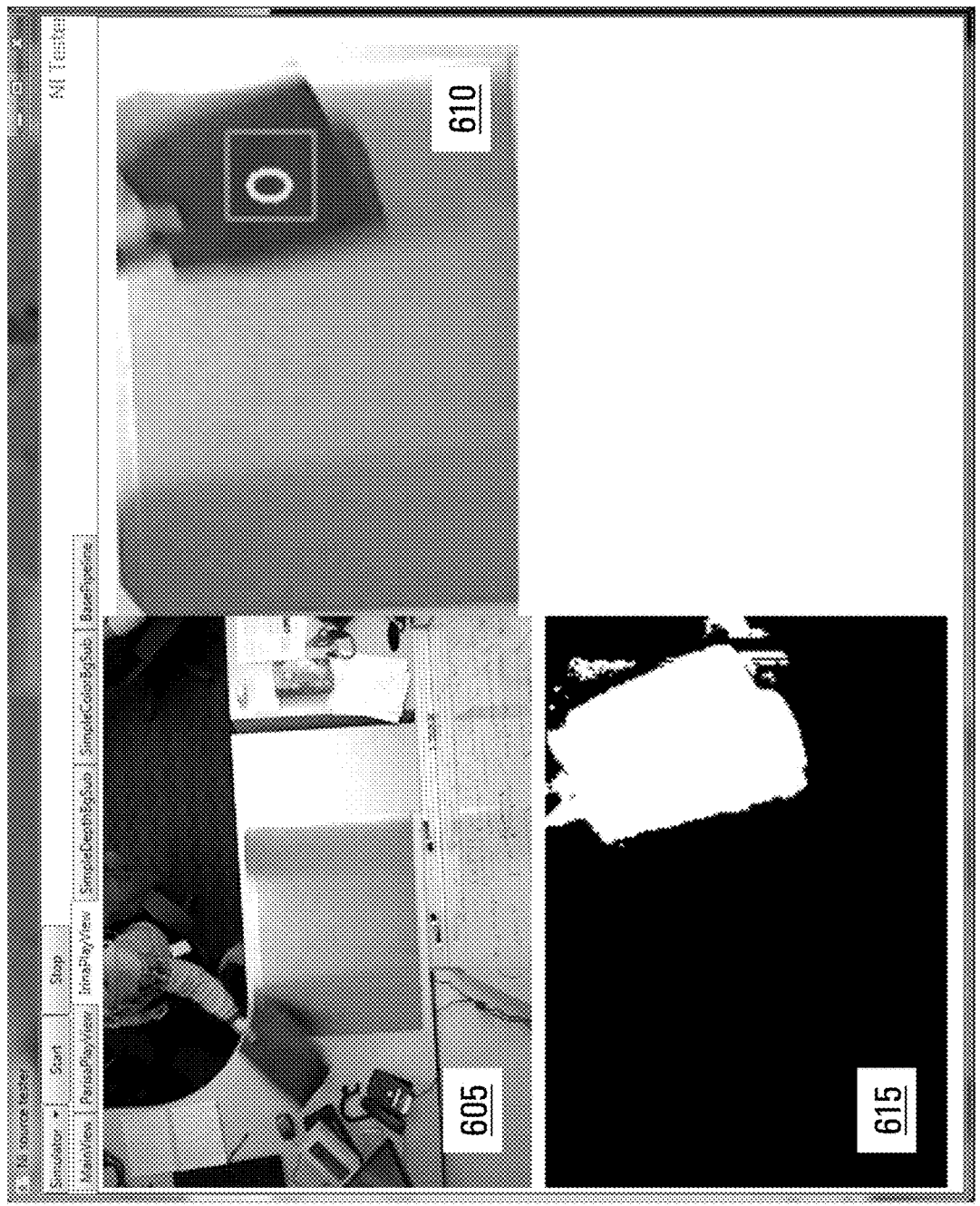
FIG. 6 is a screen capture illustrating the operation of a transaction monitoring system in a normal scan scenario in accordance with a non-limiting embodiment.

FIG. 6 is a screen capture illustrating a what occurs during a regular scan of an object at transaction area 120. In this case, the transaction area 120 is simulated simply at a desk, as shown in the top view of the simulated transaction area shown in the upper left quadrant 605 of FIG. 6. The upper right quadrant 610 and lower left quadrant 615 show respectively a frame captured by the visual sensor 151 and the depth sensor 153. In this example the area of monitoring corresponds roughly to the area of the gray mat shown on the top view of the transaction area. In this example the background has been subtracted to isolate the foreground of the image data and depth data and although the background is still visually shown in the frame of image data shown in quadrant 610, the frame of depth data in quadrant 615 shows the object being moved in stark contrast from the black background. It should be noted that there is a slight delay between the top view of quadrant 605 and the image data and depth data of quadrants 610 and 615. The green object is being moved across the area of monitoring. The 3D motion detector 410 identifies the object (marked with a red square and the label "0") based on processed image and depth data and follows successfully the object from its entry into the area of monitoring to its exit. In addition, since the object is being waved into and out of the area of monitoring, the object recognition module 430, while not necessarily identifying the object from a database, recognizes the object from one exit to the next entry. This recognition, provided in the object identifier 431 that the object is the same (even if not specifically known) as the previously-exited object, is used alongside 3D motion data 411, which determine that the object re-enters proximally in space and time from where it was last seen exiting the area of monitoring, to ascertain that it is the same object at every pass rather than plural copies of a same item. In one embodiment, this determination may be made by the abnormal activity classifier 470, provided that 3D motion data 411 is passed through the transaction object comparator 466 (which may actually by wholly absent in this and other examples) to the abnormal activity classifier 470 and that behavior analyzer 455 likewise pass-through or otherwise provides the abnormal activity analyzer 470 with sufficient motion data; however in this embodiment the determination is made by the behavior analyzer 455, which is modified to access the object identity data 431 required to make the determination.

Figure 7A:
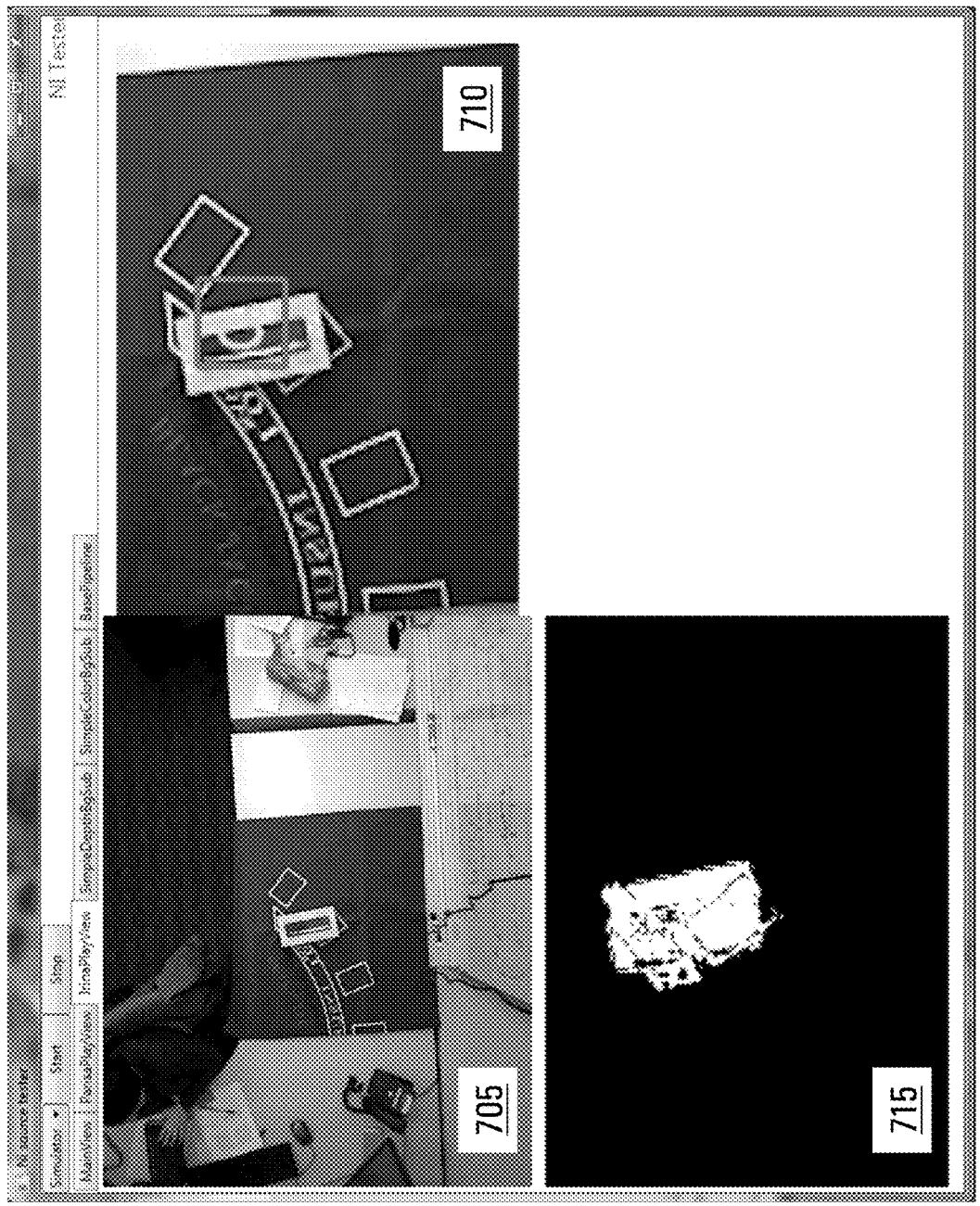
FIG. 7A is a screen capture illustrating the operation of a transaction monitoring system in a scan occlusion scenario at a first point in time in accordance with a non-limiting embodiment.
Figure 7B:
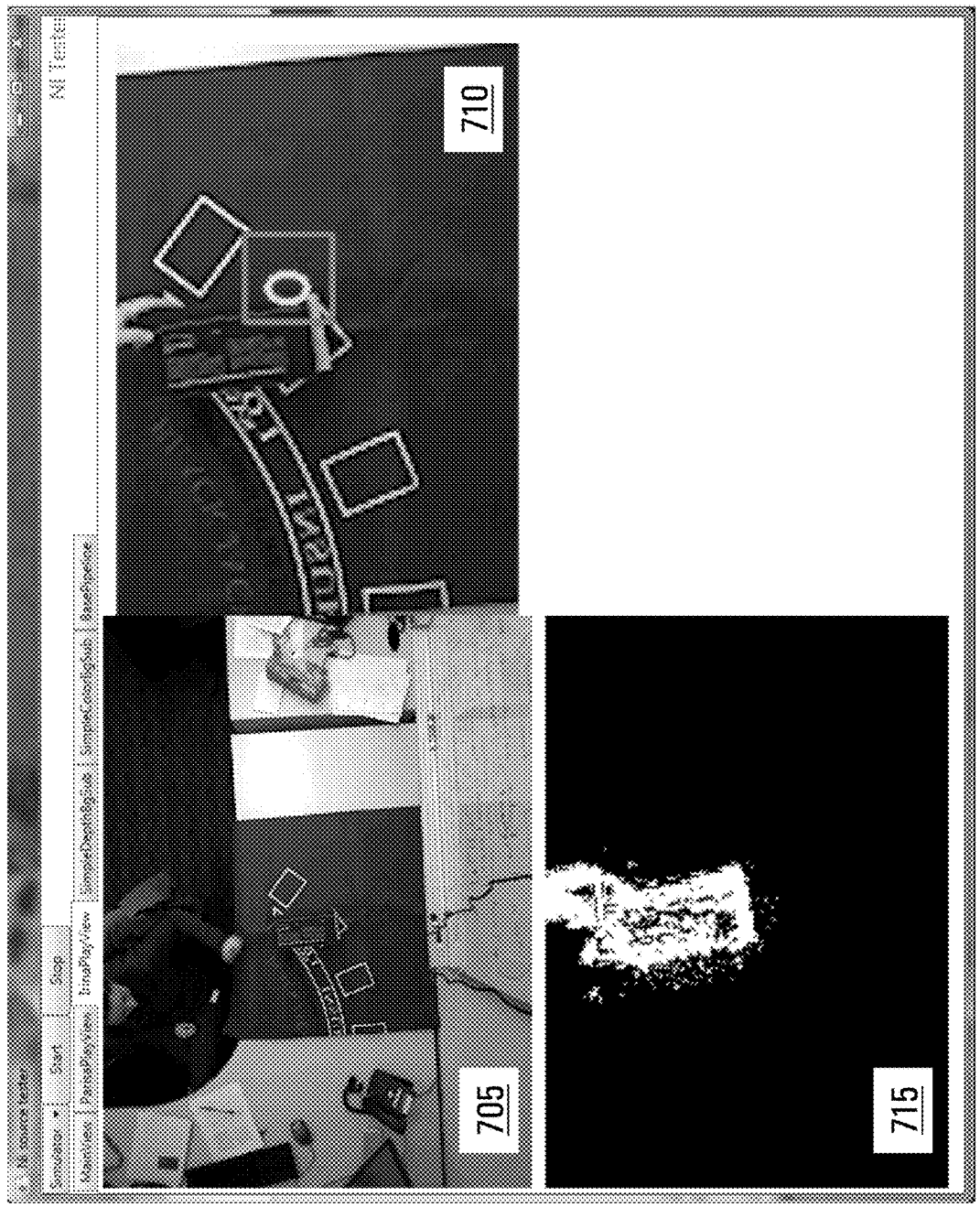
FIG. 7B is a screen capture illustrating the operation of a transaction monitoring system in the scan occlusion scenario of FIG. 7B at a second point in time.

FIG. 7A and FIG. 7B show a screen capture illustrating what occurs when an item is occluded by another in a setting similar to that shown in FIG. 6. FIG. 7A corresponds to a first time, where a first stand alone in the area of monitoring. Like in the example of FIG. 6, the top left quadrants 705 show a top view of a simulated transaction area 705 while the top right quadrant 710 and bottom right quadrant 715 show a frame captured by the visual sensor 151 and depth sensor 153. Like in the example of FIG. 6, background subtraction and fusion-based 3D motion detection has occurred leading to the identification of the topmost object, marked here with the red box and "0" label. In FIG. 7B, which shows the same scenario at a slightly later time we see that a second object has been placed overtop the first object thereby almost occluding it completely. As shown, the 3D motion detector 410 using the techniques described herein is able to keep track of the position of the first object, here showing the box and label over the very little edge sticking out from the overlapping object. Even when the object is completely covered, the 3D motion detector maintains track of where the object is located, based on the position of the overlapping object. Thus even if the overlapping object were picked up together with the first object and carried off screen, the 3D motion detector 410 would know that the first object has been carried off screen.

FIGS. 8A-8D show a slightly more complex movement called a "merge-split" whereby two objects are moved together until one overlaps the other and then carry on moving apart either in the same direction they travelled to merge or back where they came from. Here too, FIGS. 8A, 8B and 8C capture the same scenario at different times, FIG. 8A being captured at a first time, FIG. 8B being captured at a second later time and FIG. 8C being captured at a third, slightly even later, time. To simulate a more challenging scenario, both objects were rotated as they were moved over the area of monitoring and furthermore were moved in and out of the area of monitoring.

Figure 8A:
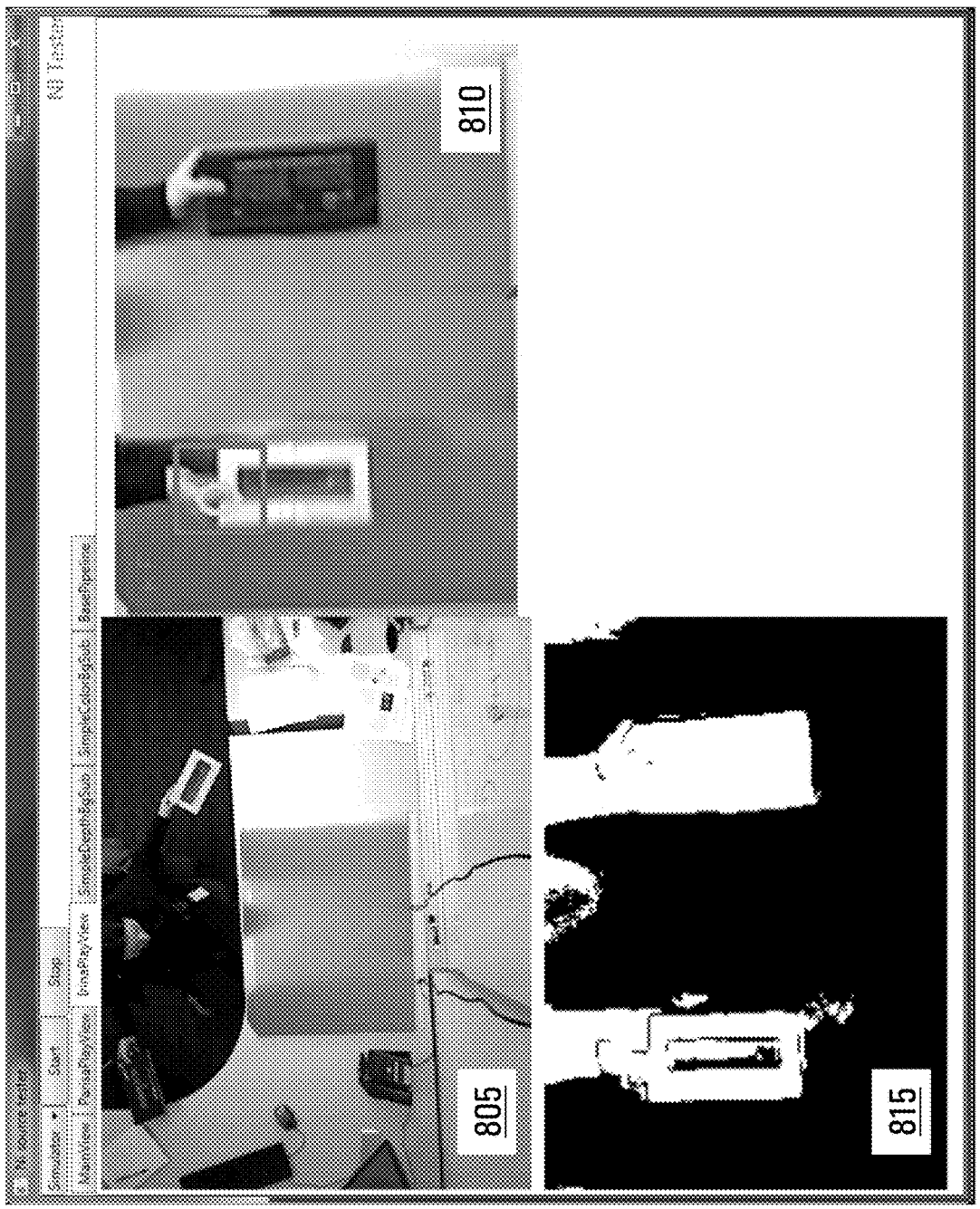
FIG. 8A is a screen capture illustrating the operation of a transaction monitoring system in a merge-split scenario at a first point in time in accordance with a non-limiting embodiment.
Figure 8B:
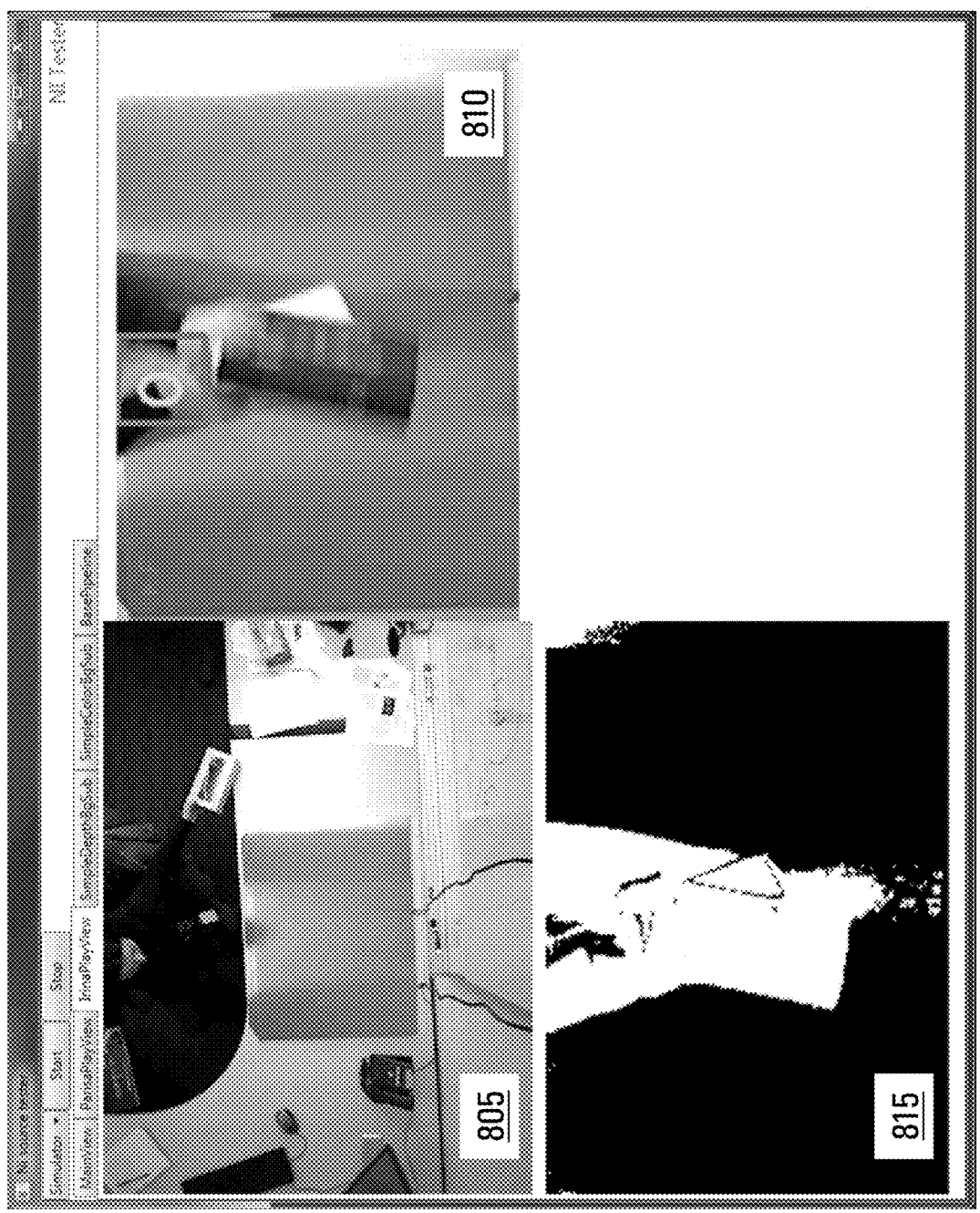
FIG. 8B is a screen capture illustrating the operation of a transaction monitoring system in the merge-split scenario of FIG. 8A at a second point in time.

The 3D motion detector 410 detects a path in three dimensions for both objects. In FIG. 8A, the two objects have just entered the area of monitoring. One of the objects, the light-colored box, is identified and marked here with the red box and "0" label. As the two objects, which are similar in dimensions, are brought closer together, they eventually overlap with the light-colored box being occluded, at least in part, by the other object. This is shown in FIG. 8B. As shown, using the disclosed techniques, the light colored box remains tracked even while below the other object. As the two objects separate, the path in three dimensions of the light colored box continues to be tracked without confusing one object for the other, which would be difficult to avoid without the multi-modal sensor based techniques described herein.

Figure 8C:
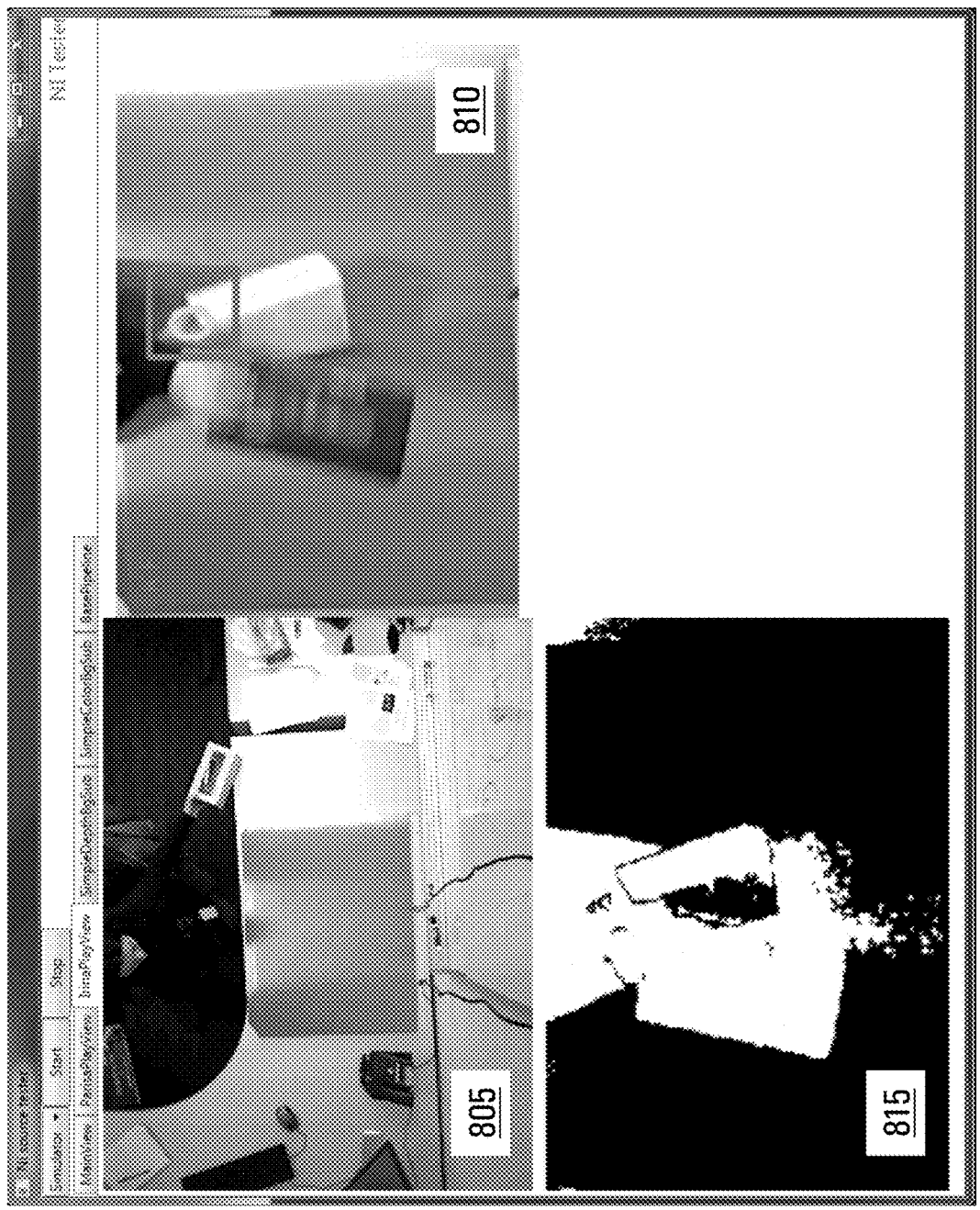
FIG. 8C is a screen capture illustrating the operation of a transaction monitoring system in the merge-split scenario of FIG. 8A at a third point in time.

The example of FIGS. 8A-8C also shows that the system has no issues following the objects as they are rotated using the techniques described herein. This allows the system to be useful in detecting fraud whereby an object is deliberately rotated near a barcode scanner in order to prevent the barcode scanner from recognizing the object.

Although barcodes and barcode scanners are referred to herein, it is to be understood that other types of scanners are intended to be included, including QR codes/scanners and any other type of labeling/scanning. Even visual scanners that identify products based on appearance may be envisaged for transaction recording. Any such solution, like the barcode scanner, can cooperate with the transaction monitoring system 100 to provide transaction input.

Figure 4B:
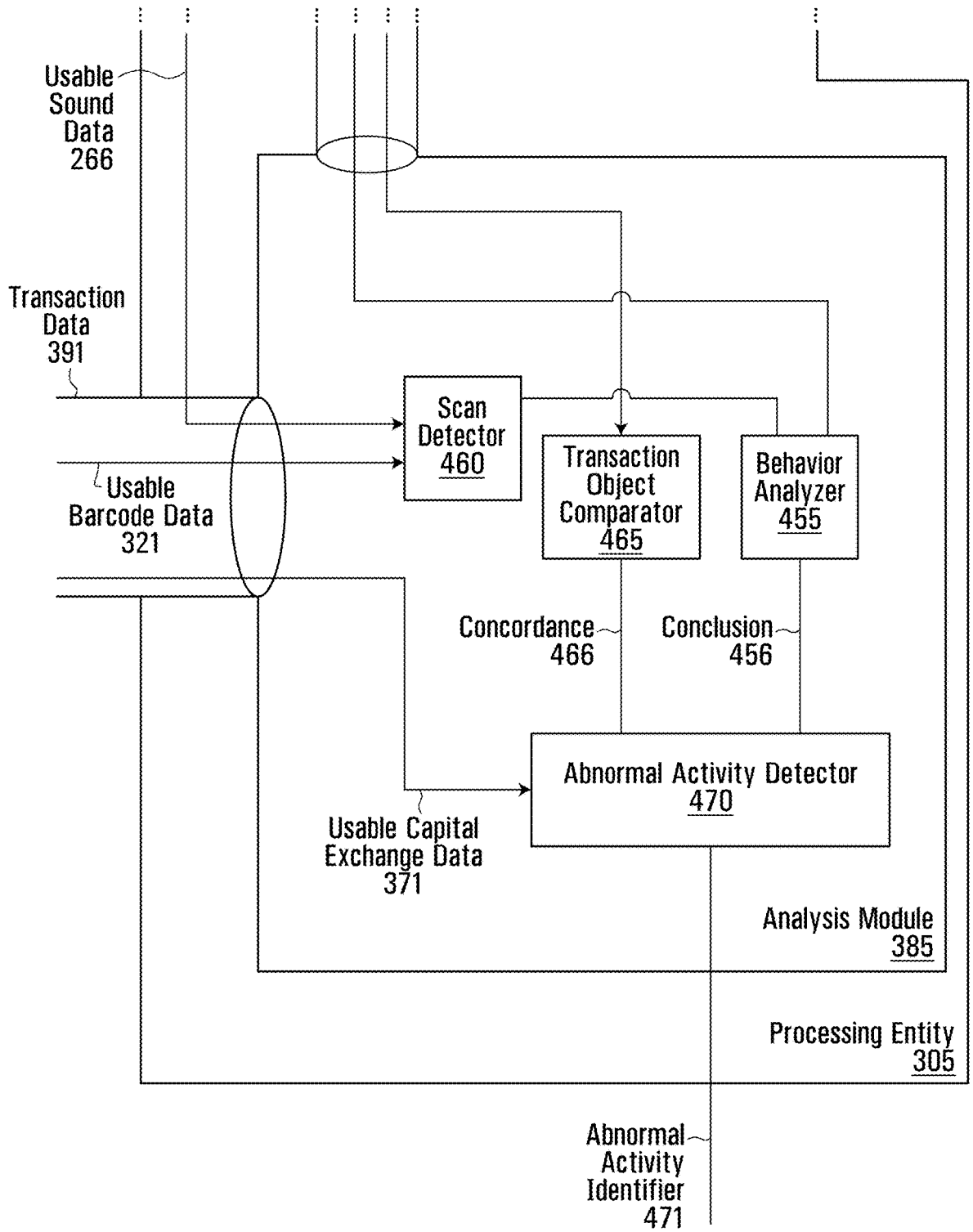
FIG. 4B is a block diagram showing another portion of the processing entity of the system controller of FIG. 3.

Returning to the example of FIG. 4A and FIG. 4B, the analysis module 385 analyzes the outcome of 3D object tracking and 3D object recognition modules in order to detect whether abnormal activity such as sweethearting events or fake scans have occurred. To this end, the analysis module verifies for each item that enters to the scene that it is tracked to an exit and that a scan event occurs. This visual scan may be matched and synchronized with 3 sources: the beep sound comes out from the scanner, the 3D pattern recognition results and also the item barcode. Abnormal activity may be recognized when these three sources do not match, such as when an item is visually confirmed to be scanned but this is not recorded by the sound sensor or barcode scanner.

The analysis module is depicted in FIG. 4B according to a logical block diagram where blocks represent logical, though not necessarily physical, entities. In this particular case, each block illustrates a function or portion of the analysis module 385. Behavior analyzer 455 receives the 3D motion data 411 and the output of the scan detector 460, which is scan confirmation data 461. The behavior analyzer determines whether abnormal activity has occurred on the basis of the 3D motion data 411 and, sometimes, the scan confirmation data 461.

In one example, the behavior analyzer 455 ascertains whether an object was concealed during a purported transaction. For example, the behavior analyzer 455 will ascertain whether an unidentifiable object was concealed on the basis of an unidentifiable fragment of an object having been detected, or possibly an arm being partially concealed as if carrying an object underneath another. In such a case, the behavior analyzer 455 may conclude that an was passed into the egress area 115 without being scanned. This conclusion will be provided as conclusion 456.

The behavior analyzer 455 may also use the scan confirmation data 461 in order to make a conclusion. To this end, the behavior analyzer 455 of this example determines on the basis of the 3D motion data 411 when an object passes through the transaction area 120 or into the egress area 115 and verifies whether the scan confirmation data 461 confirms a scan event has occurred. If an object has not been scanned, the behavior analyzer 455 provides a conclusion 456 indicative of this. If an object has been scanned, the behavior analyzer 455 provides a conclusion 456 indicative of this.

The behavior analyzer 455 also notes the number of objects passed in a transaction as defined in the 3D path data 411. When multiple objects are passed simultaneously, it is not always possible for the behavior analyzer to know, even with scan confirmation data 461, whether all objects have been scanned since it is, in some retail examples, possible for a cashier to enter a multiplier for a number in the transaction recorder 135 and then simply scan a single instance of the item. For this reason, the behavior analyzer also provides in this example an indication of the number of objects that were passed through the transaction area 120 or into the egress area 115.

The scan detector 460 is an optional module that determines whether a scan event has occurred based on the available transaction input. In this particular case, the transaction input includes useable sound data 366 and useable item data 321, which is indicative of a barcode scan. The scan detector 460 determines whether the useable sound data 366 is indicative of a scan, e.g. by determining whether a scanning beep has been detected by the microphone using any suitable audio analysis method. The scan detector also 460 also assesses whether the barcode data indicates a scan has occurred by consulting the useable item data 321. If the two indicate a scan event, the scan detector 460 generates scan confirmation data 461 indicative of a scan. If neither indicate a scan, the scan detector 460 generates scan confirmation data 461 indicative that no scan has occurred. If the two inputs do not agree, the scan detector can apply any suitable decision process. For example, the scan detector may generate scan confirmation data 461 indicating that a scan has occurred if the useable item data 321 indicates a barcode scan but the useable sound data 366 does not (since the sound may have been drowned out by ambient noise) but generate scan confirmation data 461 indicating that a scan has no occurred if the useable item data 321 does not indicate a barcode scan but the useable sound data 366 does (since the sound can be "spoofed" by a suitable playback device).

The scan detector 460 is optional and alternative embodiments may exclude it if, in one example, the logic of the scan detector 460 is migrated to the behavior analyzer 455 or if only one type of scan-confirming data is available. In this latter case the scan detector 460 may still be present but as a simple Boolean decision maker or, depending on the format of the available data, may be omitted entirely if the available data is already Boolean in nature.

The analysis module 385 may also comprise, as it does in this example, a transaction object comparator 465. The transaction object comparator 465 is configured for receiving a transaction object identifier identifying an object being the subject of a transaction is configured for receiving a transaction object identifier identifying an object being the subject of a transaction. In this example, the useable item data 321 comprises an identifier of scanned objects and the transaction object comparator 465 accesses the object identity data 431 and the useable item data 321 to ascertain whether scanned object(s) correspond to the object(s) recognized by the object recognition module 430. To this end, the transaction object comparator 465 may consult a database (not shown) to match identifiers provided in the object identity data 431 and in the useable item data 321 if the two types of data identify objects using different types of identifiers. Such a database may be locally stored (e.g. in memory 360) or may be remote, e.g. in a remote network location. If the object identify data 431 and the useable item data 321 both use the same identification system, the comparison may be trivial. In this, or even in other, cases, the transaction object comparator 465 may be alternatively eliminated by shifting the logic thereof to other modules such as to the abnormal activity classifier 470.

The transaction object comparator 465 determines whether the transaction object identified in the transaction input and the object recognized by the object recognition module 430 concord and generates an indication of concordance 466 on the basis the observed concordance. When the object(s) identified in the transaction input and the object(s) identified by the recognition module 430 are the same, the indication of concordance 466 indicates a match. When they are not, or when the transaction input indicates no object at all the indication of concordance 466 indicates no match. Likewise if there are plural objects detected by the object recognition module 430, the indication of concordance 466 may indicate plural matches, no matches, or some matching cases and some unmatching cases. It is also possible for there to be more objects identified from the transaction input than from the object recognizer 430. This may occur when a scanned item has been occluded from view, leading the object recognizer 430 unable to ascertain its identity. In this example in the case of a failed match, the concordance data 466 indicates whether it is a type 1 failure: object recognized and object scanned are not the same, a type 2 failure: object recognize has no scanned equivalent, or a type 3 failure: object scanned has no recognized equivalent.

The indication of concordance 466 and the conclusion 456 of the behavior analyzer 455 are used by the abnormal activity classifier 470 to ascertain the presence of abnormal activity. The abnormal activity classifier 470 output an abnormal activity identifier 471. The abnormal activity identifier 471 may have take different forms according to different embodiments. In one example 470, the abnormal activity identifier 471 is simply an indication of whether or not abnormal activity has occurred (or in a simpler case yet, the abnormal activity classifier 470 merely outputs an abnormal activity identifier 471 when abnormal activity is detected, and outputs nothing if no abnormal activity is detected).

In the present example, however, the abnormal activity classifier ascertains what kind of abnormal activity has occurred on the basis of the conclusion 456 and concordance data 466 and outputs, when abnormal activity is detected, an indication of the abnormal activity detected.

In the retail example, the abnormal activity may be, for example, an unscanned item, an occluded item, an incorrectly scanned item, unmatched plurality or incorrect capital exchange.

An unscanned item occurs when an object has been detected as passing into the egress area 115 without having been scanned. This will be reflected by the conclusion 456 of the behavior analyzer, and may also be reflected n the concordance data 466 as a failed concordance. When the abnormal activity classifier 470 observes these conclusions, the abnormal activity classifier 470 generates abnormal activity identifier indicating an unscanned item.

An occluded item, may be a form of unscanned item, when the occluded item has not been scanned. The abnormal activity detector 470 ascertain that there is a case of an occluded item when the conclusion 456 indicates as much, and then ascertains whether the occluded item is an unscanned item on the basis of whether the concordance data 466 indicates a type 2 failure of concordance. Even if the occluded item is not unscanned, in this embodiment the abnormal activity classifier 470 still determines that an abnormal activity has occurred if the occluded item was not able to be identified by the object recognition module 430 (as indicated by a type 3 failure of concordance) since it is not possible to confirm that no fraud has occurred. In such a case the abnormal activity classifier 470 generates an abnormal activity identifier 471 indicative of an occluded item, which may optionally be treated with lower priority by an operator/operating device.

An incorrectly scanned item occurs when an item detected by the object recognition module 430 does not correspond to the object identified from the transaction input. This may be an indication of fraud, for example barcode switching or sweethearting. The abnormal activity classifier ascertains that an incorrectly scanned item has occurred on the bases of conclusion 456 data that indicates normal scanning behavior but the concordance data 466 indicates no match. When the abnormal activity classifier 470 observes these conclusions, the abnormal activity classifier 470 generates abnormal activity identifier indicating an incorrectly scanned item.

An unmatched plurality occurs when a plurality of objects are passed through the transaction area but the transaction input indicates a different number of items recorded in the transaction. This may be the result of fraud (particularly sweethearting) whereby a cashier passes several (typically identical) items as one in the transaction recordation (or, more generally, fewer than the actual number of items) so as to give the client free copies of the items. The abnormal activity classifier 470 can determine whether an unmatched plurality has occurred in a number of ways, depending on the embodiment. In an embodiment where it is not possible to enter manually a multiplier in the transaction recorder 135, the number of detected scans should match the number of items identified by the behavior analyzer 435 and therefore the behavior analyzer 455 may perform a comparison between the two numbers and output a conclusion 456 indicative of an unmatched plurality (or, perhaps more simply of a number of unscanned items) where the numbers don't match. Determination by the abnormal activity classifier 470 is then trivial. In an alternate example, however, the processing entity 305 has access to transaction recorder data received over transaction recorder connection 137 via an appropriate interface, which also indicates the items that have been recorded into the transaction in progress. This information may be used as additional input to the scan detector 460, to the behavior analyzer 455 and to the transaction object comparator 465. It will be noted that this kind of input may replace entirely the barcode data 322 and even sound data 367. In such an embodiment, the behavior analyzer 455 generates a conclusion 456 of an unmatched plurality if the numbers received from the scan detector 460 do not matched those of the 3D path, and likewise the transaction object comparator 465 indicates a number of type 2 failures. From this basis the abnormal activity classifier 470 generates an abnormal activity identifier 471 indicating an unmatched plurality. Alternatively unmatched pluralities may be treated as ordinary unscanned items.

Incorrect capital exchange occurs when the capital (e.g. money) exchanged for a transaction does not match the amount due in the transaction. In the retail setting, this is typically avoided by making cashiers accountable for their cash register, by using electronic payment methods or by using mechanical cash receiving/dispensing machines. However, in gambling settings and in retail/restaurant settings where there is a shared cash register, this can still be a problem. To detect incorrect capital exchange, the abnormal activity classifier 470 accesses useable capital exchange data 371 and compares it to the real-life purported transaction. To this end, the transaction object comparator 465 may provide the abnormal activity classifier with object identification information as well as concordance 466, and in one particular example only the object identification indicated in object identity data 431 derived by the object recognition module 430. Using this information, the abnormal activity classifier access a price database (not shown) which may be a remote networked database adds up the price of the objects in the transaction. Alternatively the abnormal activity classifier 470 may receive only the price of transaction objects, the price being found and passed down by another module, e.g. the transaction object comparator 465 or the object recognition module 430. Upon completion of the transaction, the abnormal activity classifier calculates other price modifiers such as taxes (if not included in the received price) and estimates the total capital exchange which it then compares to the capital exchange indicated in the useable capital exchange data 371. If there is a discrepancy, the abnormal activity classifier 470 generates an abnormal activity identifier indicative of a discrepancy and, optionally, of the magnitude (range or precise number) of the discrepancy.

Optionally, the abnormal activity classifier may offer a certain leeway by ignoring small discrepancies, e.g. in the order of a few cents.

While in the above example the abnormal activity classifier 470 is configured to identify abnormal activity, the abnormal activity classifier 470 may also be configured to determine whether the pattern corresponds to normal activity. For example, it may positively determine that the pattern corresponds to abnormal activity when a pattern fails to be determined as normal activity. The abnormal activity identifier 471 may accordingly actually be an indication of normal activity identified by the abnormal activity classifier 470.

The above cases of abnormal activity classification are exemplary only. It will be understood that a number of other types of abnormal activity can be monitored by the present system, including different retail abnormal activities as well as gambling abnormal activities.

In a gambling setting, the capital exchange may be ascertained from multi-modal sensor data 317. Typically in the gambling setting, capital exchange involves the exchange of cash equivalents such as casino chips over a viewable surface, such as a cards table. The identification of these cash equivalents may take place in the same manner as the identification of retail items as described above. Thus instead of receiving input from a transaction recorder (also possible where present), the abnormal activity classifier 470 may calculate the total capital exchange (based on amounts and known values of chips identified on their appearance, for example), and verify that this concords with a gaming outcome for a particular type of gambling game. It should be noted that in a similar manner cash exchanges may also be monitored in the retail setting and used by the abnormal activity classifier 470 to ascertain whether appropriate capital exchange occurred in the same manner as with transaction recorder data.

The gaming outcome may also be recognized by the transaction monitoring system 100, particularly in games like blackjack where cards are shown face up, but also in games like poker where even unrevealed cards have meaning if they are thrown away (as tracked in the manner described above) in a fold. Likewise, the transaction monitoring system can also monitor the outcome of a game of French roulette (identifying the position of the ball on visibly identified grooves in the roulette wheel, and identifying the presence and quantity of winning and losing bets based on visibly identifiably chips on the table with regards to their position on the table with respect to visual landmarks and, optionally, color if the color identifies the gambler). As such, using the techniques described above, combined with known rules of gambling games, the transaction monitoring system 100 can ascertain the results of a gambling game and compute the capital exchanges due.

In addition, cards or other gambling assets may also be tracked using the above-described techniques so as to identify abnormal activity such as the sudden appearance or disappearance of cards, which may be indicative of cheating. Likewise the die used in craps can be tracked to ensure no substitution with a weighed die. Since in a casino there may be more occurrences of occlusions, which could lead to false positives, the multi-modal sensor 150 may be outfitted with additional visual and/or depth sensors to capture more views of the transaction area. In such a case the processing entity 305 may function similarly but with appropriately expanded background subtractor 305 (to subtract background from each view), and motion 3D motion detector 410 (including more candidate motion region extractors and a motion fusing ROI extractor 415 that fuses a greater number of view together, albeit in similar fashion). Even with an expanded multi-modal sensor, it may be preferable to merely output warnings to pit bosses or remote security personnel (manning CCTV displays) to monitor certain gamblers or dealers. This is still advantageous because it can provide pit bosses or security personnel with real-time info on potential cheaters. More grievous abnormal activity, such as detected theft of chips followed by the departure of the stealing gambler may still be treated as a de facto alert.

The transaction monitoring system 100 can be used to track the displacement not only of gambling assets but also of capital assets, e.g. chips. Using the transaction monitoring system 100 in the manner described herein, it is possible to track the placement of chips on a table, e.g. to detect if they are moved on a roulette table after this is no longer permitted, and/or to detect if the chips that have been lost at game are surreptitiously re-taken by the losing gambler. Likewise the transaction monitoring system may be used to monitor capital assets to detect if capital assets won in a game are taken by a non-winning gambler and/or to detect if the capital assets of one gambler are surreptitiously taken by another or by the dealer. Even in the absence of deliberate fraud or theft, using the transaction monitoring system 100 to monitor game results and payouts can detect accidental incorrect payouts.

Returning to FIG. 3, the system controller 210 comprises an output interface which, in this example, includes a visual warning interface 345, a loudspeaker interface 350, and a network output interface 355. The visual warning interface 345 and loudspeaker interface 350 serve to generate an audio visual alert in the case of abnormal activity. In particular, where grievous abnormal activity is detect, such as theft, the audio visual alert serves to attract the attention of authorities while discouraging other would-be thieves of fraudsters from stealing. To this end, the visual warning interface 345 and loudspeaker interface 350 both access the abnormal activity identifier 471 and determine on the basis of the identifier whether an audio/visual (respectively) alert is to be output. In this embodiment, the visual warning interface 345 and loudspeaker interface each consult a table of cases to determine whether an abnormal activity identifier warrants an alert (alternatively, all abnormal activity may warrant alerts). When the abnormal activity warrants an alert, the visual warning interface causes the output of a signal to a visual alarm 245 causing the visual alarm 245 to activate, while loudspeaker interface 350 causes the output of an audio alarm/warning/instructions over loudspeaker 250.

In this example, the visual warning interface and audio interface together make up an alarm interface through which an alert is emitted. It will be appreciated that an alarm interface may include only one of the visual warning interface and audio interface or may include other suitable interfaces instead of or in addition to these. For example, an alarm triggered by an alarm interface may be a local buzzer, a silent alarm to the manager or security, and indicator to cameras to start recording, or to camera systems to save/prevent discarding of recordings. The alarm interface may cause communication over a network to reach the various devices taking part in the alarm.

The network output interface serves to provide abnormal activity indications to networked equipment as needed. In one embodiment, abnormal activity are logged on the networked server 260. The abnormal activity identifiers 471 are sent to the networked server 260 for logging. As such, the network output interface may be considered in such embodiment a memory log interface, although the memory log interface may also output to a local memory log. Additionally or alternatively, the system controller 210 may also be connected to a security terminal, such as a computer running security camera monitoring software being monitored by security personnel to provide real-time indicators of abnormal activity for logging and/or response by the security personnel. To this end the abnormal activity identifier is transmitted to the security terminal. The network output interface prepares suitable messages for the network-connected devices, for example log entries for the server 260 and dispatch messages for the security terminal.

It is to be understood that these merely examples of connectivity and that the system controller 210 may be connected to other devices in other suitable manners, or may include its own user interface (e.g. with a display and input system) for use in-situ by security personnel.

It will be appreciated that the present description also provides a method for monitoring a transaction for detecting abnormal activity in the course of the transaction. As described, the sensor data may be received, in accordance with the method, from a multi-modal sensor, the sensor data comprising at least image data representative of visual information captured according to a first mode of the multi-modal sensor and depth data representative of depth information captured according to a second mode of the multi-modal sensor. Still in accordance with the method and as described herein, a fusion-based analysis may be applied to the sensor data to derive from at least the image data and the depth data a pattern representative of human activity. Further in accordance with the method and as described herein, the pattern may be analyzed to determine whether it corresponds to abnormal activity. And finally, in response to a determination that the pattern corresponds to an abnormal activity, an indication of the abnormal activity may be output. These steps and other method steps defined in the appended claims are provided hereinabove explicitly or through description of the steps undertaken by the apparatuses of the system and are also provided in the appended claims for the benefit of the reader.

As mentioned above, system controller 210 has been described herein in a general-purpose computer embodiment. It is to be understood, however, that the processing entity, any portions thereof, any other module, or indeed the whole logical embodiment of the system controller 210 could be embodied on a dedicated hardware such as an FPGA or an ASIC. It should be understood that those skilled in the arts of embedded system will be capable of programming an ASIC or FPGA to embody the algorithms provided herein. Likewise a person skilled in the arts of embedded system will be capable of creating the interfaces necessary for providing partial hardware, partial software solutions. Accordingly, the invention is not intended to be limited to any one particular medium, but is intended to include the various hardware and software, unitary or distributed embodiments available to the skilled persons.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

The invention claimed is:

1. A transaction monitoring system for detecting abnormal activity in the course of a transaction, the transaction monitoring system comprising:

a. a multi-modal sensor input interface configured for receiving sensor data from a multi-modal sensor and deriving therefrom at least image data representative of visual information captured according to a first mode of the multi-modal sensor and depth data representative of depth information;

b. a data fusing module configured for applying a fusion-based analysis to the sensor data to derive from at least the image data and the depth data a pattern representative of human activity not discernible from the image data alone, the pattern comprising a motion of a target object, wherein a fusion-based object tracking algorithm is applied by the data fusing module according to which the image data and the depth data are combined to identify the motion of the target object in three dimensions;

c. an analysis module configured for analyzing the pattern to determine whether it corresponds to abnormal activity;

d. an output interface configured for outputting, in response to a determination of the pattern corresponding to an abnormal activity, an indication of the abnormal activity.

2. The system of claim 1, wherein the sensor data comprises the image data and the depth data, the depth data being captured according to a second mode of the multi-modal sensor.

3. The transaction monitoring system of claim 1, wherein the data fusing module comprises a background subtractor configured for eliminating from consideration background portions of the sensor data.

4. The transaction monitoring system of claim 3, wherein the background subtractor is configured to apply a first background subtraction algorithm to the image data and a second background subtraction algorithm to the depth data.

5. The transaction monitoring system of claim 4, wherein the first background subtraction algorithm employs a gaussian mixture model.

6. The transaction monitoring system of claim 3, wherein the second background subtraction algorithm takes a running average of depth image data and derives a temporal difference image.

7. The transaction monitoring system of claim 1, wherein the pattern comprises an object identity, the data fusing module being configured for applying a fusion-based object recognition algorithm according to which the image data and the depth data are combined to derive therefrom a target object identity.

8. The transaction monitoring system of claim 7, wherein object recognition algorithm is a 3D object recognition algorithm and comprises a feature extraction submodule and a feature classification submodule.

9. The transaction monitoring system of claim 1, further comprising a transaction input interface configured for receiving a transaction input, wherein the analysis module is configured for determining whether the pattern corresponds to abnormal activity at least in part on the basis of the transaction input.

10. The transaction monitoring system of claim 1, wherein the abnormal activity comprises at least one of: an occluded item, an incorrectly scanned item, unmatched plurality or incorrect capital exchange.

11. The transaction monitoring system of claim 1, wherein the analysis module is configured to determine whether the pattern corresponds to normal activity, the analysis module determining that the pattern corresponds to abnormal activity when a pattern fails to be determined as normal activity.

12. The transaction monitoring system of claim 1, wherein the analysis module is configured to identify what kind of abnormal activity the pattern corresponds to, and to cause the output to output an abnormal activity identifier indicating the kind of abnormal activity the pattern corresponds to.

13. The transaction monitoring system of claim 1, wherein the output interface comprises an alarm interface configured to cause an alert to be emitted.

14. The transaction monitoring system of claim 1, wherein the output interface comprises a memory log interface configured for outputting to a memory log the indication of the abnormal activity.

15. A transaction monitoring system for detecting abnormal activity in the course of a transaction, the transaction monitoring system comprising:
   a. a multi-modal sensor disposed overhead a transaction area configured for performing sensing from a top-down perspective and for outputting sensor data;
   b. a transaction monitoring system controller in communication with the multi-modal sensor for receiving and processing the sensor data and ascertaining the occurrence of the abnormal activity, the system controller being configured for:
      i. receiving the sensor data and deriving therefrom at least image data representative of visual information and depth data representative of depth information;
      ii. applying a fusion-based analysis to the image data and the depth data to derive from both the image data and the depth data a pattern representative of a human activity not discernible from the image data alone, the pattern comprising a motion of a target object, wherein a fusion-based object tracking algorithm is applied according to which the image data and the depth data are combined to identify the motion of the target object in three dimensions;
      iii. analyze the pattern derived to determine whether it corresponds to an abnormal activity;
      iv. in response to determining that the pattern corresponds to an abnormal activity, generate an indication of the abnormal activity.

16. The transaction monitoring system of claim 15, wherein the multi-modal sensor is a distributed sensor comprising at least one visual input and at least one depth input the at least one visual input and at least one depth input being distinct from one another.

17. The transaction monitoring system of claim 15, wherein the multi-modal sensor is configured for performing sensing under multiple modes simultaneously.

18. A method for monitoring a transaction for detecting abnormal activity in the course of the transaction, the method comprising:
   a. receiving sensor data from a multi-modal sensor;
   b. deriving from the sensor data at least image data representative of visual information captured according to a first mode of the multi-modal sensor and depth data representative of depth information;
   c. applying a fusion-based analysis to the sensor data to derive from at least the image data and the depth data a pattern representative of human activity not discernible from the image data alone, the pattern comprising a motion of a target object, wherein a fusion-based object tracking algorithm is applied according to which the image data and the depth data are combined to identify the motion of the target object in three dimensions;
   d. analyzing the pattern to determine whether it corresponds to abnormal activity;
   e. in response to a determination that the pattern corresponds to an abnormal activity, outputting an indication of the abnormal activity.

19. The method of claim 18, the applying a fusion-based analysis comprises removing background portions of the sensor data.

20. The method of claim 19, wherein removing the background comprises applying a first background subtraction algorithm to the image data and a second background subtraction algorithm to the depth data.

21. The method of claim 20, wherein the first background subtraction algorithm employs a gaussian mixture model.

22. The method of claim 20, wherein the second background subtraction algorithm takes a running average of depth image data and derives a temporal difference image.

23. The method of claim 22, wherein the motion comprises a rotation of the target object, the method comprising performing feature extraction on the target object on the basis of the movement in three dimensions of extracted features.

24. The method of claim 18, wherein the sensor data is representative of a certain area of monitoring, the method further comprising defining the target object on the basis of the sensor data when a particular object enters the area of monitoring.

25. The method of claim 24, wherein applying the fusion-based analysis comprises identifying at least one subsequent position for the target after defining the target, and deriving from the at least one subsequent position the path in three dimensions of the target object.

26. The method of claim 25, further comprising defining a target object exit when the particular object leaves the area of monitoring.

27. The method claim 18 wherein the pattern comprises an object identity, the method comprising applying a fusion-based object recognition algorithm according to which the image data and the depth data are combined to derive therefrom a target object identity.

28. The method of claim 27, wherein applying the fusion-based object recognition algorithm comprises a performing a three dimensional feature extraction from to extract features from the sensor data and performing a feature classification to identify the target object.

29. The method of claim 28, further comprising accessing an object database to obtain classification data and comparing extracted feature to the classification data.

30. The method of claim 18, further comprising receiving a transaction input and determining whether the pattern corresponds to abnormal activity at least in part on the basis of the transaction input.

31. The method of claim 30, wherein the transaction input comprises a transaction object identifier identifying an object being the subject of a transaction.

32. The method of claim 31, wherein the transaction object identifier is a UPC.

33. The method of claim 32, further comprising deriving the transaction indicia from the sound of an object being scanned.

34. The method of claim 30, wherein the transaction input is a transaction indicia indicative of the occurrence of a transaction.

35. The method of claim 18, wherein the abnormal activity comprises at least one of: an unscanned object, an occluded item, an incorrectly scanned item, unmatched plurality or incorrect capital exchange.

36. The method of claim 18, wherein determining whether the pattern corresponds to abnormal activity comprises determining whether the pattern corresponds to normal activity and concluding that that the pattern corresponds to abnormal activity when a pattern fails to be determined as normal activity.

37. The method of claim 18, further comprising identifying a kind of abnormal activity to which the pattern corresponds to, and outputting an abnormal activity indicator indicating the kind of abnormal activity the pattern corresponds to.

38. The method of claim 18, wherein outputting an indication of the abnormal activity comprises emitting an alert.

39. The method of claim 18, wherein outputting an indication of the abnormal activity comprises outputting to a memory log for storage the indication of the abnormal activity.

40. The method of claim 18, wherein the image data is characterized by a first resolution and the depth data is characterized by a second resolution different from the first resolution, wherein applying a fusion-based analysis comprises reconciliating the first and second resolution.

41. The method of claim 18, wherein the transaction is a gambling transaction, the method detecting abnormal activity in the course of the gambling transaction.

42. The method of claim 18, further comprising generating at the multi-modal sensor the sensor data.

43. The method of claim 42, further comprising capturing at the multi-modal sensor the visual information and generating therefrom the image data and capturing at the multi-modal sensor the depth information and generating therefrom the depth data.

44. The method of claim 43, wherein the visual information and the depth information are captured simultaneously.

45. A transaction monitoring system for detecting abnormal activity in the course of a transaction, the transaction monitoring system comprising:
   a multi-modal sensor input interface configured to receive, from a multi-modal sensor, image data obtained in accordance to a first mode of the multi-modal sensor and depth data obtained in accordance to a second mode of the multi-modal sensor;
   a data fusing module configured to generate a pattern of human activity comprising a motion of a target object by applying a fusion-based object tracking algorithm according to which the image data and the depth data are combined to identify the motion of the target object in three dimensions by:
   performing background removal to the depth data and background removal to the image data;
   extracting candidate motion regions from the depth data and candidate motion regions from the image data;
   fusing the depth data candidate motion regions with the image data candidate motion regions; and
   tracking an object using the fused depth data candidate motion regions and image data candidate motion region to generate the pattern;
   an analysis module configured for analyzing the pattern to determine whether it corresponds to abnormal activity; and
   an output interface configured for outputting, in response to a determination of the pattern corresponding to an abnormal activity, an indication of the abnormal activity.

* * * * *